United States Patent
Takayama et al.

(10) Patent No.: US 6,443,548 B1
(45) Date of Patent: Sep. 3, 2002

(54) PRINTING APPARATUS AND METHOD FOR PRINTING USING A PLURALITY OF INKS HAVING DIFFERENT DENSITIES

(75) Inventors: Hidehito Takayama, Chigasaki; Kazumasa Matsumoto, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,380

(22) Filed: Jun. 24, 1999

(30) Foreign Application Priority Data

Jun. 29, 1998 (JP) .......................... 10-183028
Jun. 21, 1999 (JP) .......................... 11-174668

(51) Int. Cl.[7] ................................. B41J 2/01
(52) U.S. Cl. .......................... 347/14; 347/15
(58) Field of Search .............. 347/14, 15, 43; 358/298

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 4,746,935 A | 5/1988 | Allen | 346/140 R |
| 4,860,026 A * | 8/1989 | Matsumoto et al. | 347/15 |
| 5,734,391 A * | 3/1998 | Tanaka et al. | 347/14 |

FOREIGN PATENT DOCUMENTS

| | | | |
|---|---|---|---|
| EP | 0606022 A1 | 7/1994 | H04N/1/032 |
| EP | 0707966 A2 | 4/1996 | B41J/2/05 |
| EP | 0942585 A2 | 9/1999 | H04N/1/23 |
| JP | 54-56847 | 5/1979 | |
| JP | 59-123670 | 7/1984 | |
| JP | 60-71260 | 4/1985 | |
| JP | 59-138461 | 8/1994 | |

OTHER PUBLICATIONS

"An Adaptive Algorithm for Spatial Grey Scale", R. Floyd, et al., SID '75 Digest, pp. 36–37.

"Multivalued Error Diffusion Method", National Conference of Communication, Dept. in Showa 53 Year, Society of Electronic Communication in Japan.

* cited by examiner

Primary Examiner—Craig A. Hallacher
(74) Attorney, Agent, or Firm—Fitzpatrick, Cella, Harper & Scinto

(57) ABSTRACT

A printing method and printing apparatus capable of printing a high-quality image representing excellent tonality even when a plurality of inks having the same color and different densities are adhered to the substantially same pixel position on a printing medium to form one print dot and represent tonality. When printing is to be performed on a printing medium by discharging ink from an inkjet printhead using a plurality of inks having different densities, this apparatus calculates a lapse time from previous ink discharge, predicts a density change according to the lapse time based on the calculated lapse time, selects an ink and ink discharge amount suitable for representing a density value indicated by input multi-valued image data based on the predicted density change of ink, and drives the printhead so as to cause ink discharge from the printhead based on the selected ink and ink discharge amount.

24 Claims, 20 Drawing Sheets

FIG. 1

| | DENSITY RATIO | 1 | 2 | 3 | 4 |
|---|---|---|---|---|---|
| THIN (LOW) ↑ | DENSITY DATA | d1 | d2 | d3 | d4 |
| | 0 | 0 | 0 | 0 | 0 |
| | 1 | 2 | 0 | 0 | 0 |
| | 2 | 0 | 2 | 0 | 0 |
| | 3 | 2 | 2 | 0 | 0 |
| | 4 | 0 | 0 | 2 | 0 |
| | 5 | 2 | 0 | 2 | 0 |
| | 6 | 0 | 2 | 2 | 0 |
| | 7 | 2 | 2 | 2 | 0 |
| | 8 | 0 | 0 | 0 | 2 |
| | 9 | 2 | 0 | 0 | 2 |
| | 10 | 0 | 2 | 0 | 2 |
| | 11 | 2 | 2 | 0 | 2 |
| | 12 | 0 | 0 | 2 | 2 |
| | 13 | 2 | 0 | 2 | 2 |
| | 14 | 0 | 2 | 2 | 2 |
| ↓ THICK (HIGH) | 15 | 2 | 2 | 2 | 2 |

2 : LARGE DROPLET DISCHARGE
1 : SMALL DROPLET DISCHARGE
0 : NOT DISCHARGE

FIG. 7

| INK | D1 | D2 | D3 | D4 | OVERLAID TRANSMISSION DENSITY |
|---|---|---|---|---|---|
| DENSITY RATIO | 1 | 2 | 4 | 8 | |
| TRANSMISSION DENSITY (D) | 0.16D | 0.32D | 0.64D | 1.28D | |
| 8-BIT IMAGE DENSITY SIGNAL LEVEL | d1 | d2 | d3 | d4 | |
| 0 | 0 | 0 | 0 | 0 | 0D |
| 17 | 2 | 0 | 0 | 0 | 0.16D |
| 34 | 0 | 2 | 0 | 0 | 0.32D |
| 51 | 2 | 2 | 0 | 0 | 0.48D |
| 68 | 0 | 0 | 2 | 0 | 0.64D |
| 85 | 2 | 0 | 2 | 0 | 0.8D |
| 102 | 0 | 2 | 2 | 0 | 0.96D |
| 119 | 2 | 2 | 2 | 0 | 1.12D |
| 136 | 0 | 0 | 0 | 2 | 1.28D |
| 153 | 2 | 0 | 0 | 2 | 1.44D |
| 170 | 0 | 2 | 0 | 2 | 1.6D |
| 187 | 2 | 2 | 0 | 2 | 1.76D |
| 204 | 0 | 0 | 2 | 2 | 1.92D |
| 221 | 2 | 0 | 2 | 2 | 2.08D |
| 238 | 0 | 2 | 2 | 2 | 2.24D |
| 255 | 2 | 2 | 2 | 2 | 2.4D |

2 : LARGE DROPLET DISCHARGE
1 : SMALL DROPLET DISCHARGE
0 : NOT DISCHARGE

THIN (LOW) ←→ THICK (HIGH)

FIG. 10

| ADDRESS OFFSET (hexadecimal representation) | NON-DISCHARGE DOT COUNT (N) | DENSITY INCREASE RATE (dD) |
|---|---|---|
| 0H | 0 | 1+(0.5/5000)×0 |
| 4H | 1 | 1+(0.5/5000)×1 |
| 8H | 2 | 1+(0.5/5000)×2 |
| CH | 3 | 1+(0.5/5000)×3 |
| . | . | . |
| . | . | . |
| . | . | . |
| 190H | 100 | 1+(0.5/5000)×100 |
| 194H | 101 | 1+(0.5/5000)×101 |
| 198H | 102 | 1+(0.5/5000)×102 |
| . | . | . |
| . | . | . |
| . | . | . |
| 4E20H | 5000 | 1+(0.5/5000)×5000 |
| 4E24H | 5001 | 1+(0.5/5000)×5001 |
| 4E28H | 5002 | 1+(0.5/5000)×5002 |
| . | . | . |
| . | . | . |
| . | . | . |
| 7FF4H | 8189 | 1+(0.5/5000)×8189 |
| 7FF8H | 8190 | 1+(0.5/5000)×8190 |
| 7FFCH | 8191 | 1+(0.5/5000)×8191 |

FIG. 13

| COMBINATION No. | INK DENSITY RATIO | | D1 1 | D2 2 | D3 4 | D4 8 | OVERLAID TRANS-MISSION DENSITY |
|---|---|---|---|---|---|---|---|
| | TRANSMISSION DENSITY | | 0.16D | 0.32D | 0.64D | 1.28D | |
| | TRANSMISSION DENSITY (DENSITY SIGNAL CONVERSION VALUE) | | 17 | 34 | 68 | 136 | |
| | IMAGE DENSITY SIGNAL LEVEL | THRESHOLD | d1 | d2 | d3 | d4 | |
| 0 | 0 | | 0 | 0 | 0 | 0 | 0D |
| | | 8.5 | | | | | |
| 1 | 17 | | 2 | 0 | 0 | 0 | 0.16D |
| | | 25.5 | | | | | |
| 2 | 34 | | 0 | 2 | 0 | 0 | 0.32D |
| | | 42.5 | | | | | |
| 3 | 51 | | 2 | 2 | 0 | 0 | 0.48D |
| | | 59.5 | | | | | |
| 4 | 68 | | 0 | 0 | 2 | 0 | 0.64D |
| | | 76.5 | | | | | |
| 5 | 85 | | 2 | 0 | 2 | 0 | 0.8D |
| | | 93.5 | | | | | |
| 6 | 102 | | 0 | 2 | 2 | 0 | 0.96D |
| | | 110.5 | | | | | |
| 7 | 119 | | 2 | 2 | 2 | 0 | 1.12D |
| | | 127.5 | | | | | |
| 8 | 136 | | 0 | 0 | 0 | 2 | 1.28D |
| | | 144.5 | | | | | |
| 9 | 153 | | 2 | 0 | 0 | 2 | 1.44D |
| | | 161.5 | | | | | |
| 10 | 170 | | 0 | 2 | 0 | 2 | 1.6D |
| | | 178.5 | | | | | |
| 11 | 187 | | 2 | 2 | 0 | 2 | 1.76D |
| | | 195.5 | | | | | |
| 12 | 204 | | 0 | 0 | 2 | 2 | 1.92D |
| | | 212.5 | | | | | |
| 13 | 221 | | 2 | 0 | 2 | 2 | 2.08D |
| | | 229.5 | | | | | |
| 14 | 238 | | 0 | 2 | 2 | 2 | 2.24D |
| | | 246.5 | | | | | |
| 15 | 255 | | 2 | 2 | 2 | 2 | 2.4D |

THIN (LOW) ↑ ... ↓ THICK (HIGH)

2 : LARGE DROPLET DISCHARGE
1 : SMALL DROPLET DISCHARGE
0 : NOT DISCHARGE

| y\x | 0 | 1 | 2 | 3 | 4 | 5 | 6 | 7 | 8 | 9 | 10 | ... |
|---|---|---|---|---|---|---|---|---|---|---|---|---|
| 0 | 0 | 0 | 1 | 0 | 0 | 0 | · | · | · | · | · | ... |
| 1 | 0 | 0 | 1 | 0 | 0 | 0 | · | · | · | · | · | ... |

Md2

| y\x | 0 | 1 | 2 | 3 | 4 | 5 | 6 | 7 | 8 | 9 | 10 | ... |
|---|---|---|---|---|---|---|---|---|---|---|---|---|
| 0 | 2 | 2 | 0 | 0 | 0 | 0 | · | · | · | · | · | ... |
| 1 | 2 | 2 | 0 | 0 | 0 | 0 | · | · | · | · | · | ... |

Md3

| y\x | 0 | 1 | 2 | 3 | 4 | 5 | 6 | 7 | 8 | 9 | 10 | ... |
|---|---|---|---|---|---|---|---|---|---|---|---|---|
| 0 | 1 | 2 | 2 | 0 | 0 | 0 | · | · | · | · | · | ... |
| 1 | 1 | 2 | 2 | 0 | 0 | 0 | · | · | · | · | · | ... |

Md4

| y\x | 0 | 1 | 2 | 3 | 4 | 5 | 6 | 7 | 8 | 9 | 10 | ... |
|---|---|---|---|---|---|---|---|---|---|---|---|---|
| 0 | 0 | 0 | 0 | 0 | 0 | 0 | · | · | · | · | · | ... |
| 1 | 0 | 0 | 0 | 0 | 0 | 0 | · | · | · | · | · | ... |

2 : LARGE DROPLET DISCHARGE
1 : SMALL DROPLET DISCHARGE
0 : NOT DISCHARGE

PRINTING APPARATUS AND METHOD FOR PRINTING USING A PLURALITY OF INKS HAVING DIFFERENT DENSITIES

BACKGROUND OF THE INVENTION

This invention relates to a printing method and printing apparatus and, more particularly, to a printing method and printing apparatus for printing an image on a printing medium using a printhead according to an inkjet printing method.

Printing units incorporated in printers, copying machines, facsimile apparatuses, and the like print an image consisting of a dot pattern on a printing medium such as a paper sheet or thin plastic plate on the basis of image information. Such printing apparatuses are classified according to their printing methods into an inkjet type, wire dot type, thermal type, laser beam type, and the like.

Of these types, the inkjet type (inkjet printing apparatus) is designed to print an image by discharging ink (printing solution) droplets from the orifices of a printhead and adhering them to a printing medium.

In recent years, many printing apparatuses have been used, and high performance such as high-speed printing, high resolution, high quality, and low noise has been required for the printing apparatuses. As printing apparatuses that can meet such requirements, the above inkjet printing apparatuses have been used as a relatively compact printing apparatus and have become rapidly popular.

One of these inkjet printing apparatuses employs a printhead having an array of a plurality of orifices to realize high printing speed, and another one of these inkjet printing apparatuses employs a plurality of printheads in correspondence with the number of types of color inks in order to be capable of color printing.

In consideration of the demands for high resolution and high quality, half-tone processing methods such as a dither method and error diffusion method are used in these inkjet printing apparatuses as methods of faithfully reproducing the tonality of image information.

According to these tonality reproduction methods, when a printing apparatus has a high resolution (1,000 dots/inch or more), excellent multi-level printing can be performed. If, however, a printing apparatus has a low resolution (about 360 to 720 dots/inch), the printed dots of a highlight portion of a formed image become conspicuous, and the discontinuity of pixels tends to increase the graininess of a formed image.

In order to increase the number of tonality levels, a method of representing each print dot itself by a multi-valued dot is recently adopted.

For example, according to a known method, the voltage, the pulse width, or the like to be applied to a printhead is controlled to modulate the diameter of each print dot adhered to a printing medium, thereby attaining tonality. However, there is a limit to the minimum size of a printable dot according to this method. Although it is difficult to stably reproduce many tonality values, this method is put into practical use for representing several tonality levels.

A density modulation method is also available, in which the density of dots within a predetermined dot matrix (a predetermined area) is changed while the dot size remains the same. However, this method requires a considerably large area to increase the number of representable tonality levels, and hence the resolution decreases.

In consideration of the above methods for improving the tonality and obtaining high-density, multi-level images by using an inkjet printing apparatus, for example, the following methods have been proposed and put into practice: a so-called multiple droplet method of forming one dot by adhering a plurality of droplets to substantially the same portion on a printing medium, i.e., changing the number of droplets to be adhered onto the same portion, thereby expressing tonality; a printing method of reproducing tonality by forming at least two types of print dots having different densities in the same color by using a plurality of inks having different densities; and a combination of these methods.

As one of the pseudo tonality reproduction methods, an error diffusion method (R. FLOYD & L. STENBERG, "An Adaptive Algorithm for Spatial Grey Scale" SID' 75 DIGEST), pp. 36–37) is available.

As an image printing method using this error diffusion method, Katoh, Y. Arai, Y. Yasuda, "Multivalued Error Diffusion Method" (National Conference of Communication, Department in Showa 53 Year, Society of Electronic Communication in Japan (1973), p. 504 (in Japanese)) proposed an error diffusion method using a plurality of thresholds, unlike the conventional error diffusion method using one fixed threshold.

If, for example, the image data value per pixel ranges from 0 to 255, error diffusion is performed using "128" as a threshold to obtain binary data in the prior art. In contrast to this, in the "multi-valued error diffusion method" by Katoh, Y. Arai, Y. Yasuda, when a half-tone image is to be printed with two different ink densities, "85" and "175" are set as thresholds to obtain ternary print data with two different printing densities.

Furthermore, efforts have recently been made to realize a method of performing half-tone printing with three or more different ink densities to obtain multi-valued data with three or more different densities and represent a high quality image.

To recover the print quality from deterioration in an inkjet print apparatus, suction means and pressurizing means are used to remove undesirable substances and bubbles from liquid paths by forcibly drawing ink from the nozzles of the printhead. Alternatively, ink coagulations near orifices are removed by cleaning the ink discharge surfaces with a wiper.

In addition, since ink adhered to the orifice surfaces of the printhead upon ink discharge may cause a discharge failure, the orifice surfaces of the printhead are wiped at a predetermined timing.

Furthermore, to discharge ink whose viscosity has increased upon evaporation of the ink solvent from an unused nozzle during printing operation, preliminary discharge, which differs from ink discharge for printing, is performed at a predetermined timing. With this operation, fresh ink is always supplied into each nozzle to perform stable printing. In this way, recovery operation is done.

However, although fresh ink is supplied into a nozzle by the above-described recovery operation, the ink solvent gradually evaporates from the nozzle tip immediately after recovery operation, resulting in an increase in ink density in the nozzle tip with time.

In the multiple droplet method or the method of representing tonality by using inks having the same color and different densities, in particular, the tonality balance deteriorates with an increase in ink density, and the tonality continuity loses smoothness. As a result, pseudo outlines appears on a printed image, and the quality deteriorates in some case.

SUMMARY OF THE INVENTION

Accordingly, it is an object of the present invention to provide a printing method and printing apparatus capable of printing a high quality image showing excellent tonality even when a plurality of inks having the same color and different densities are adhered to substantially the same portion on a printing medium to form one print dot and represent tonality.

According to one aspect of the present invention, the foregoing object is attained by providing a printing method of performing printing on a printing medium by discharging ink from an inkjet printhead using a plurality of inks having different densities, comprising: an input step of inputting multi-valued image data; a calculation step of calculating a lapse time from previous ink discharge by the printhead; a prediction step of predicting a density change of ink according to the lapse time based on the lapse time calculated at the calculation step; a selection step of selecting a type of ink and ink discharge amount suitable for representing a density value indicated by the input multi-valued image data based on the density change of ink predicted at the prediction step; and the driving step of driving the printhead so as to cause ink discharge from the printhead based on the type of ink and ink discharge amount selected at the selection step.

The selection step preferably includes a step of selecting a type of ink to be discharge based on the multi-valued image data and a step of changing a discharge amount of the selected type of ink in accordance with the predicted density change.

By driving the printhead, droplets of a plurality of types of inks having different densities can be discharged to the substantially same pixel position of the printing medium.

The prediction step preferably uses a characteristic change table storing the relationship between the lapse time and ink density change. The characteristic change table may be prepared for each of a plurality of inks having different densities, and may be rewritable.

A plurality of printheads can be used in correspondence with the plurality of inks having different densities.

The selection step can comprise selecting the type of ink and an ink discharge amount for each pixel subjected to printing.

The plurality of inks having different densities are inks of the same color.

The printing method desirably further comprises the pseudo half-tone step of performing pseudo half-tone processing such as an error diffusion method in order to represent a density value indicated by the input multi-valued image data.

According to another aspect of the present invention, the foregoing object is attained by providing a printing apparatus for performing printing on a printing medium by discharging ink from an inkjet printhead using a plurality of inks having different densities, comprising: input means for inputting multi-valued image data; calculation means for calculating a lapse time from previous ink discharge by the printhead; prediction means for predicting a density change of ink according to the lapse time based on the lapse time calculated by the calculation means; selection means for selecting a type of ink and ink discharge amount suitable for representing a density value indicated by the input multi-valued image data based on the density change of ink predicted by the prediction means; and driving means for driving the printhead so as to cause ink discharge from the printhead based on the type of ink and ink discharge amount selected by the selection means.

The apparatus preferably includes means for selecting a type of ink to be discharge based on the multi-valued image data and means for changing a discharge amount of the selected type of ink in accordance with the predicted density change.

The printing apparatus using the printing method preferably comprises the following aspects in addition to the above-described preferred aspects of the printing method.

For example, the printhead comprises a plurality of nozzles for discharging ink, each of the plurality of nozzles comprises an electrothermal transducer for generating heat energy in order to discharge ink by the heat energy, and each of the plurality of nozzles comprises a plurality of electrothermal transducers for changing an ink discharge amount from each of the plurality of nozzles.

Further, in a case where the type of ink and an ink discharge amount for each pixel subjected to printing are selected, a table showing the relationship between a density value represented by the input multi-valued image data, and a representable density value by a combination of inks having different densities is referred.

According to still another aspect of the present invention, the foregoing object is attained by providing a computer-readable memory which stores a program for executing printing processing of performing printing on a printing medium by discharging ink from an inkjet printhead using a plurality of inks having different densities, the program comprising: codes for executing input processing of inputting multi-valued image data; codes for executing calculation processing of calculating a lapse time from previous ink discharge by the printhead; codes for executing prediction processing of predicting a density change of ink according to the lapse time based on the lapse time calculated in the calculation processing; codes for executing selection processing of selecting a type of ink and ink discharge amount suitable for representing a density value indicated by the input multi-valued image data based on the density change of ink predicted in prediction processing; and codes for executing driving processing of driving the printhead so as to cause ink discharge from the printhead based on the type of ink and ink discharge amount selected in the selection processing.

In accordance with the present invention as described above, when printing is to be performed on a printing medium by discharging ink from an inkjet printhead using a plurality of inks having different densities, a lapse time from previous ink discharge by the printhead is calculated, a density change of ink according to the lapse time is predicted based on the calculated lapse time, a type of ink and ink discharge amount suitable for representing a density value indicated by input multi-valued image data are selected based on the predicted density change of ink, and the printhead is driven so as to cause ink discharge from the printhead based on the selected type of ink and ink discharge amount.

The invention is particularly advantageous since, even when printing is performed using ink which is left in the printhead for a while and changes in density, the changed density can be corrected by using another ink having a different density or changing the ink discharge amount. As a result, a high-quality image can be printed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi- FIG. 1 is a table showing an example of the contents of an ink distribution table showing the relationship between the density value of image data and discharge of each ink;

FIG. 7 is a table showing the contents of an ink distribution table representing discharge/non-discharge of inks D1, D2, D3, and D4 with respect to an 8-bit image signal level per pixel;

FIG. 10 is a graph showing the contents of the ink density increase table (characteristics change table);

FIG. 13 is a table which is obtained by adding multi-valued error diffusion thresholds and values corresponding to the image density signal levels of transmission densities of inks to the table shown in FIG. 7;

FIG. 14 is a table showing ternary signal values stored in memories Md1, Md2, Md3, and Md4;

DETAILED DESCRIPTION OF THE PREFERRED EMBODIMENT

Figure 2:
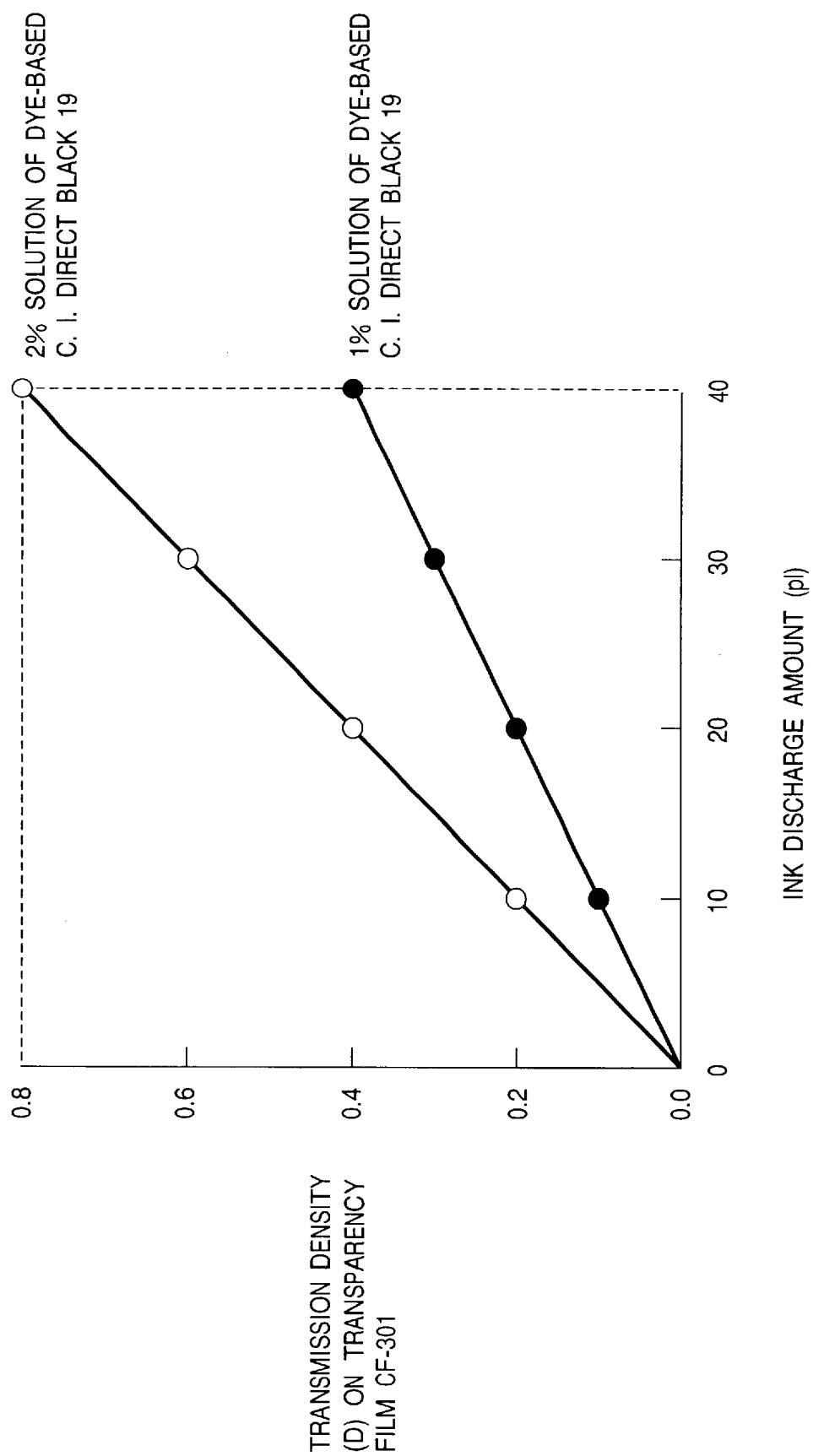
FIG. 2 is a graph showing the relationship between the ink discharge amount and transmission density in the ink/film system.

A preferred embodiment of the present invention will now be described in detail in accordance with the accompanying drawings.

In the following description, the case wherein a transmission image is printed by using an ink/film system having an additive property will be exemplified for the sake of simplicity.

[Additive Property]

An ink/film system having an additive property is a system in which when a transmission image is to be printed on a transparent film using an inkjet printer, if ink is overlaid a plurality of number of times at the same pixel position, the density of the pixel increases.

For example, such an additive property holds for the following case.

When a 2% solution of dye-based C. I. Direct Black 19 is uniformly printed on a transparency film CF-301 (CANON INC.) serving as a printing sheet by using an inkjet printer, an image having a transmission density of 0.8D is formed. Similarly, when a 1% solution of C. I. Direct Black 19 is uniformly printed on this sheet, an image having a transmission density of 0.4D is formed. In addition, an image having a transmission density of 1.2D can be formed by overlaying these two types of inks having different densities. It has been confirmed by experiment that in this ink/film system, the additive property almost holds in the range of 0 to 2.5D.

In such a ink/film system in which the additive property holds, the number of tonality levels can be greatly increased by overlaying a plurality of inks having different densities at the same pixel position.

[Ink Density]

The densities of inks used in an inkjet printer will be described next.

Consider first a case where an image is formed by using four types of inks (inks D1, D2, D3, and D4).

In a case where inks discharged from the inkjet printer can be overlaid at the same pixel position up to four times without overflowing, and an additive property holds, the number of representable tonality levels can be maximized by changing the combination of inks D1, D2, D3, and D4 to be discharged with the ratio of the densities of the respective inks being set to 1:2:4:8.

FIG. 1 is a table showing an example of the contents of an ink distribution table representing the relationship between the density value of image data and the ink discharge. This embodiment can perform two-step ink discharge with ink discharge amounts of 40 pl or 20 pl from each nozzle in one discharge operation by the printhead of the inkjet printer. In the following description, ink discharge of 40 pl will be called "large droplet discharge (=2)"; ink discharge of 20 pl, "small droplet discharge (=1)"; and no ink discharge, "not discharge (=0)".

The ink discharge amount will be described in detail later.

Referring to FIG. 1, reference symbols d1 to d4 denote signals indicating the presence/absence of discharge of the inks D1 to D4. Each of these signals d1 to d4 is a ternary signal indicating "large droplet discharge" for "2", "small droplet discharge" for "1", or "not discharge" for "0". If, for example, the density value of image data is "10", the discharged inks D2 and D4 are overlaid at the same pixel position.

In this case, since the density ratio of the four inks is set to 1:2:4:8 as described above, image data showing sixteen (16) density levels can be represented from "0" to "15" with continuous density by combining the presence/absence of discharge of these inks.

If there are "n" different ink densities, and a printing sheet can absorb the amount of ink overlaid "n" times at the same position, the ink density ratio that can represent the maximum number of tonality levels is $$D1:D2:\ldots:Di:\ldots:Dn=1:2:\ldots:2^{i-1}:\ldots:2^{n-1}$$

In this case, it is apparent that the maximum number DS of tonality levels can be expressed as $$Ds=(1+2+\ldots+2^{i-1}+\ldots+2^{n-1})+1=2^n$$

In other words, with inks having "n" different densities, the number of tonality levels per pixel can be set to the maximum number, i.e., $2^n$, by combining inks represented by density ratios of $1:2:\ldots:2^{i-1}:\ldots:2^{n-1}$.

[Ink Discharge Amount]

The ink discharge amount will be explained next.

When a transmission image is to be printed on a printing film by an inkjet printer, the ink discharge amount adhered to one pixel and the transmission density are proportional to each other.

This proportional relationship will be exemplified.

When a 2% solution of dye-based C. I. Direct Black 19 is uniformly printed on a BJ transparency film CF-301 serving as a printing medium by using an inkjet printer with an ink discharge amount of 40 pl, an image having a transmission density of 0.8D is formed. Similarly, when a 1% solution of C. I. Direct Black 19 is uniformly printed with an ink discharge amount of 40 pl, an image having a transmission density of 0.4D is formed.

If the ink discharge amounts of the two types of inks having different densities are decreased to 20 pl, and if these inks are uniformly printed, an image having a transmission density of 0.4D is obtained by the 2% solution and an image having a transmission density of 0.2D is obtained by the 1% solution.

FIG. 2 is a graph showing the relationship between the ink discharge amount and transmission density in the ink/film system.

As shown in FIG. 2, the ink discharge amount and transmission density are proportional to each other. It has been confirmed by experiment that the proportional relationship between the ink discharge amount and transmission density substantially holds in the transmission density range of 0 to 2.5D.

In this ink/film system in which the proportional relationship holds, the number of representable tonality levels can be increased by changing the ink discharge amount.

[Arrangement of Printing Apparatus]

Figure 3:
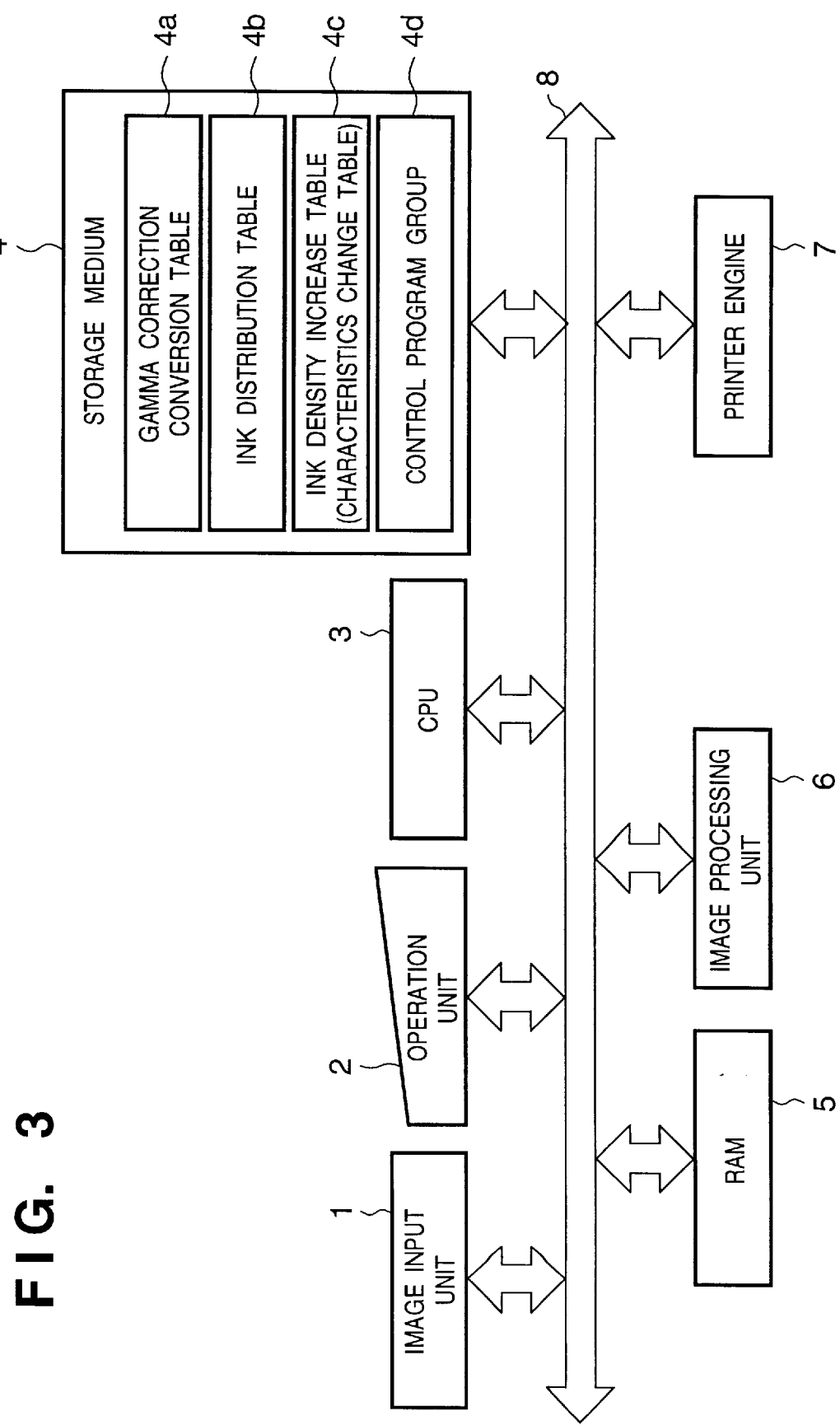
FIG. 3 is a block diagram showing the functional arrangement of an inkjet printer according to a representative embodiment of the present invention.

FIG. 3 is a block diagram showing the functional arrangement of an inkjet printer according to a representative embodiment of the present invention.

Referring to FIG. 3, reference numeral 1 denotes an image input unit such as a scanner; 2, an operation unit having various keys for setting various parameters and designating a print start; and 3, a CPU for controlling the overall apparatus by executing various control programs.

Reference numeral 4 denotes a storage medium, such as a ROM, FD (Floppy Disk), CD-ROM, HD (Hard Disk), memory card, and magneto-optical disk, that stores control programs and error processing programs for operating this apparatus. All the operations of the apparatus according to this embodiment are based on the execution of these programs.

The storage medium 4 includes a gamma correction conversion table 4a to be referred to in gamma conversion processing, an ink distribution table 4b to be referred to in ink distribution processing to be described later, a table 4c, showing the increase rate of an ink density with respect to a lapse of a non-ink-discharge period, to be referred to during multi-level processing and ink distribution processing, and a control program group 4d corresponding to various programs.

Reference numeral 5 denotes a RAM that serves as a work area used when the CPU 3 executes various programs stored in the storage medium 4, a temporary saving area in error processing, and a work area used in executing image processing. After the various tables in the storage medium 4 are copied to the RAM 5, the CPU 3 can change the contents of the tables to perform image processing while referring to the changed tables.

Reference numeral 6 denotes an image processing unit for generating a discharge pattern for realizing multi-level representation by the inkjet method on the basis of input image data; 7, a printer unit (printer engine) for forming a dot image on the basis of the discharge pattern generated by the image processing unit 6 in printing operation; and 8, a bus line for transmitting address signals, data, control signals, and the like among the components of the apparatus.

[Image Processing Unit]

The image processing unit can adopt two conceivable arrangements.

The two arrangements are one not using the error diffusion method for multi-valued representation of an image, and one using the error diffusion method.

First, the function of the image processing unit 6 which adopts the arrangement not using the error diffusion method will be described.

Figure 4A:
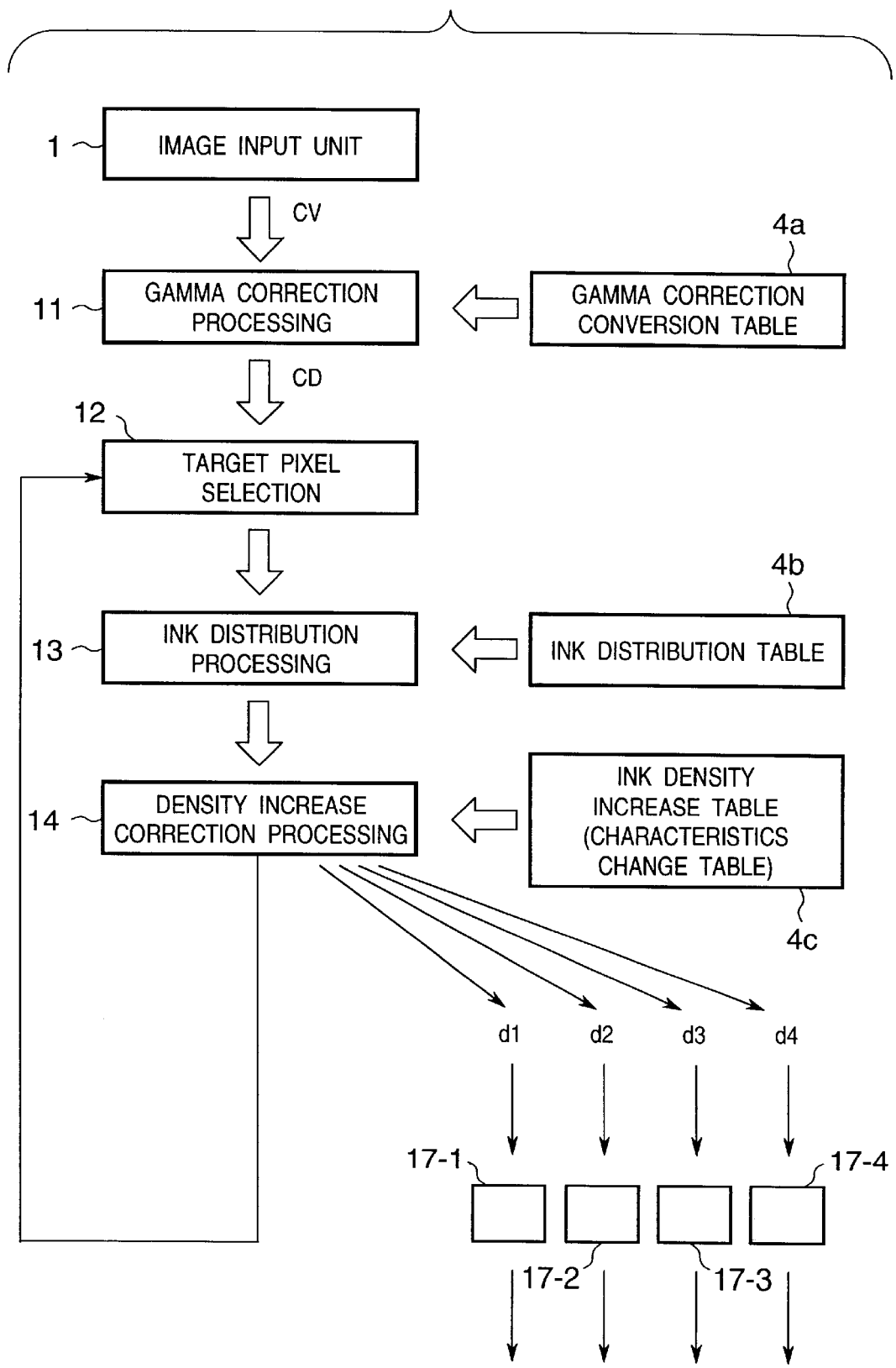
FIG. 4A is a block diagram showing the detailed functional arrangement of an image processing unit 6 which does not employ an error diffusion method.

FIG. 4A is a block diagram showing the detailed functional arrangement of the image processing unit 6.

As shown in FIG. 4A, an image signal CV input from the image input unit 1 is converted into a signal CD indicating a density in a gamma correction processor 11 using the gamma correction conversion table 4a. The obtained density signal CD is stored in a page memory area of the image processing work area in the RAM 5.

A target pixel selector 12 selects one pixel (target pixel) from the signal CD stored in the page memory area to obtain the density value. An ink distribution processor 13 refers to the ink distribution table 4b on the basis of the density value of the target pixel to select an ink combination candidate for representing the density of the target pixel.

A density increase correction processor 14 calculates the non-use time of each nozzle used for discharging ink, and predicts a specific variation in the density obtained by the ink combination selected by the ink distribution processor 13 with respect to the ideal density by referring to the ink density increase table 4c, which is linearly approximated by the least squares method. The pulse waveform of a head driving signal for discharging ink is changed, as needed, to determine the optimal density combination, i.e., ternary signals d1, d2, d3, and d4 for driving the printhead to discharge ink (for determining "large droplet discharge", "small droplet discharge", or "not discharge").

In this manner, the processing for one target pixel is complete.

The above processing is repeated for all pixels on the basis of the density value of image data, thereby generating ternary signals d1, d2, d3, and d4 for respective pixels having different densities.

Referring to FIG. 4A, reference numerals 17-1, 17-2, 17-3, and 17-4 denote delay circuits for adjusting the timings of discharging four types of inks for adhering and overlaying them to the same pixel position.

Next, the function of the image processing unit 6 which adopts the arrangement using the error diffusion method will be described.

Figure 4B:
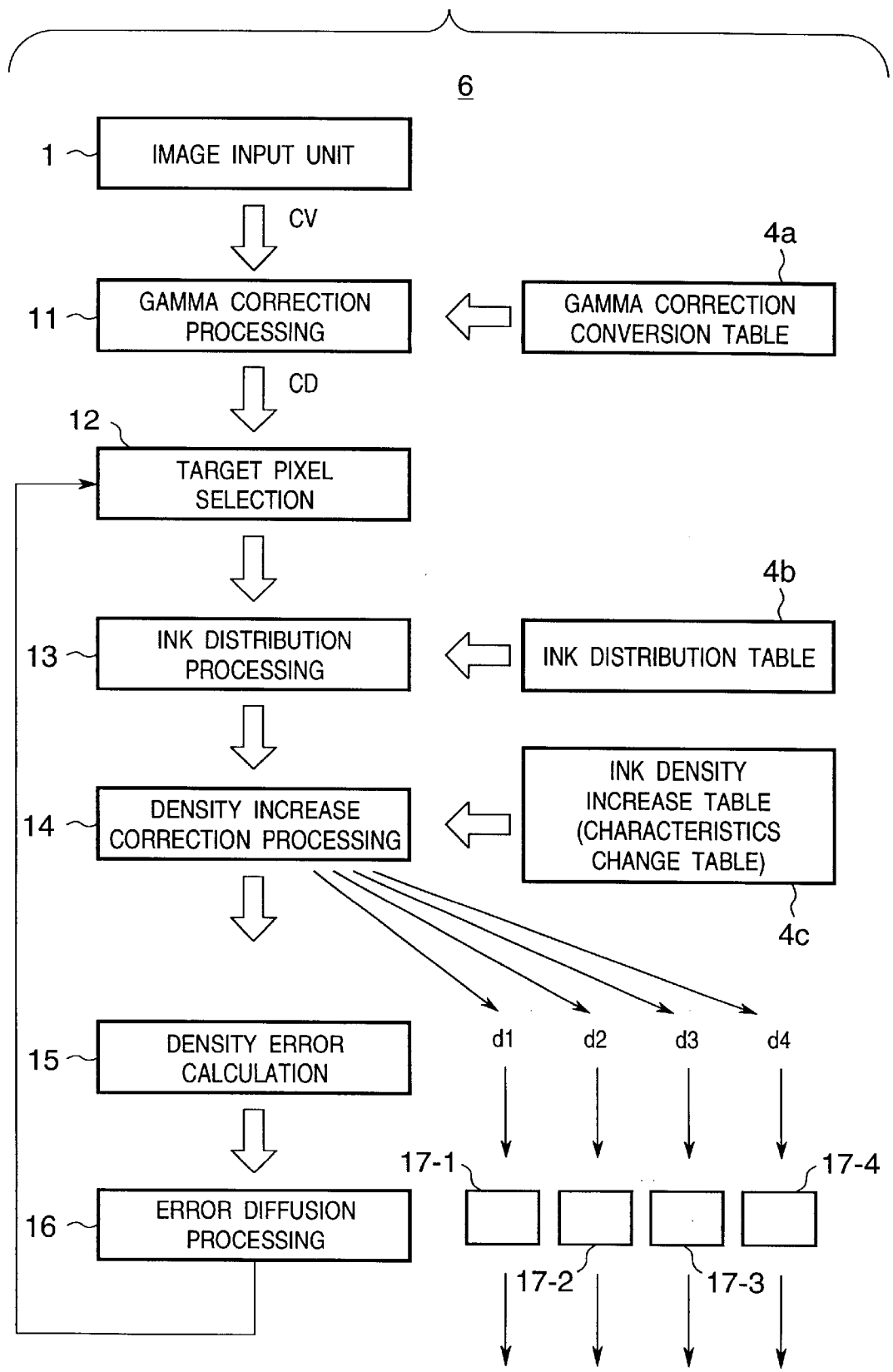
FIG. 4B is a block diagram showing the detailed functional arrangement of an image processing unit 6 which employs an error diffusion method.

FIG. 4B is a block diagram showing the detailed functional arrangement of the image processing unit 6.

As shown in FIG. 4B, an image signal CV input from the image input unit 1 is converted into a signal CD indicating a density in a gamma correction processor 11 using the gamma correction conversion table 4a. The obtained density signal CD is stored in a page memory area of the image processing work area in the RAM 5.

A target pixel selector 12 selects one pixel (target pixel) from the signal CD stored in the page memory area to obtain the density value. An ink distribution processor 13 refers to the ink distribution table 4b on the basis of the density value of the target pixel to select an ink combination candidate for representing the density of the target pixel.

A density increase correction processor 14 calculates the non-use time of each nozzle used for discharging ink, and predicts a specific variation in the density obtained by the ink combination selected by the ink distribution processor 13 with respect to the ideal density by referring to the ink density increase table 4c, which is linearly approximated by the least squares method. The pulse waveform of a head driving signal for discharging ink is changed, as needed, to determine the optimal density combination, i.e., ternary signals d1, d2, d3, and d4 for driving the printhead to discharge ink (for determining "large droplet discharge", "small droplet discharge", or "not discharge").

A density error calculation unit 15 calculates the difference between a representable density from the ink combination determined by the density increase correction processor 14 in accordance with the additive property and the density value of the target pixel.

An error diffusion processor 16 diffuses the difference calculated by the density error calculation unit 15 to neighboring pixels in the page memory area in accordance with diffusion coefficients.

In this manner, the processing for one target pixel is complete.

The above processing is repeated for all pixels on the basis of the density value of image data, thereby generating ternary signals d1, d2, d3, and d4 for respective pixels having different densities.

Referring to FIG. 4B, reference numerals 17-1, 17-2, 17-3, and 17-4 denote delay circuits for adjusting the timings of discharging four types of inks for adhering and overlaying them to the same pixel position.

[Printer Engine]

The printer engine 7 uses four printheads corresponding to four types of inks, and discharges the inks from the orifice arrays of corresponding printheads in accordance with the ternary signals d1, d2, d3, and d4 to form a multi-level image.

Figure 5:
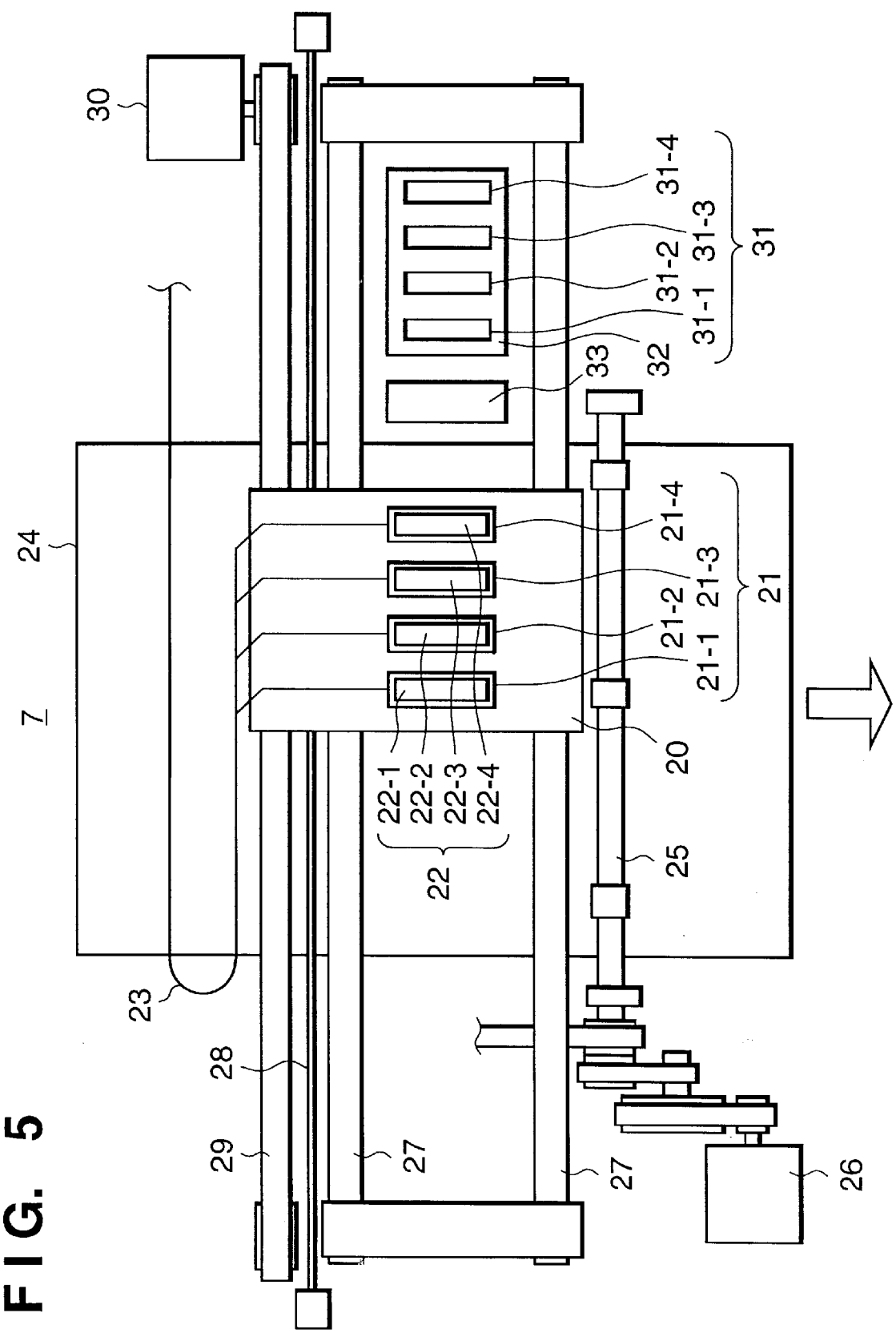
FIG. 5 is a plan view showing the detailed arrangement of a printer engine 7.

FIG. 5 is a plan view showing the detailed arrangement of the printer engine 7.

As shown in FIG. 5, four printheads 21-1 to 21-4 (to be generically referred to as printheads 21) are mounted on a carriage 20. The printheads 21-1 to 21-4 have orifice arrays for discharging inks. The orifice arrays of the printheads 21-1 to 21-4 are arranged at predetermined intervals. Inks to nozzle arrays corresponding to the printheads 21-1 to 21-4 are respectively supplied from four ink cartridges 22-1 to 22-4. The ink cartridges 22-1 to 22-4 are ink cartridges for respectively supplying the inks D1, D2, D3, and D4. The densities of these inks will be described later. The four ink cartridges are generically referred to as ink cartridges 22.

Controls signals and the like to the printhead 21 are sent through a flexible cable 23. A printing medium 24 such as printing paper, film, or thin plastic plate is held by a paper discharge roller 25 through a convey roller (not shown) and conveyed in the direction indicated by the arrow in accordance with driving of a convey motor 26. The carriage 20 is guided and supported by a guide shaft 27 and linear encoder 28. The carriage 20 reciprocates along the guide shaft 27 through a driving belt 29 according to driving of a carriage motor 30.

Two heating elements (electrothermal energy transducers) for generating heat energy for ink discharge are arranged inside (liquid paths) the orifices of the printhead 21 described above. The printhead 21 drives, on the basis of a print signal, the two heating elements at the same time for "large droplet discharge" of ink and one of them for "small droplet discharge" of ink in accordance with the read timing of the linear encoder 28 to discharge ink droplets onto the printing medium in the order of the inks D1, D2, D3, and D4 and adhere the droplets thereto, thereby forming an image.

A recovery unit 32 having a cap unit 31 is provided at the home position of the carriage 20 which is set outside the print area. The cap unit 31 includes four caps 31-1 to 31-4 in correspondence with the number of printheads. While printing is not performed, the carriage 20 is moved to the home position, and the caps 31-1 to 31-4 of the cap unit 31 close the orifices of the corresponding printheads 21-1 to 21-4, thereby preventing the respective printheads from clogging up due to the coagulation of ink upon evaporation of the ink solvent or the adhesion of undesirable substances such as dust.

The capping function of the cap unit 31 is used to prevent orifices exhibiting low printing frequencies from causing discharge failures or clogging by performing idling discharge operation, i.e., discharging ink to the cap unit 31 situated at some distance from the orifices, or is used to perform discharge recovery operation for orifices that have caused discharge failures by driving a pump (not shown) to draw ink from the orifices while the orifices are capped.

Reference numeral 33 denotes an ink accepter used to accept preliminary discharged inks immediately before the printheads 21-1 to 21-4 perform printing operation. That is, preliminary discharge is performed toward the ink accepter 33 when the printheads 21-1 to 21-4 pass over the ink accepter 33. A blade and wiping member (not shown) are provided near the cap unit 31 so as to clean the orifice formation surface of the printhead 21.

[Printhead]

The detailed arrangement of the inkjet printhead having at least two heating elements capable of independently receiving signals and being driven, and a method, applicable to the present invention, of performing multi-level printing by modulating, in accordance with the tonality value, the input timings of signals input to the heating elements will be explained.

Figure 17:
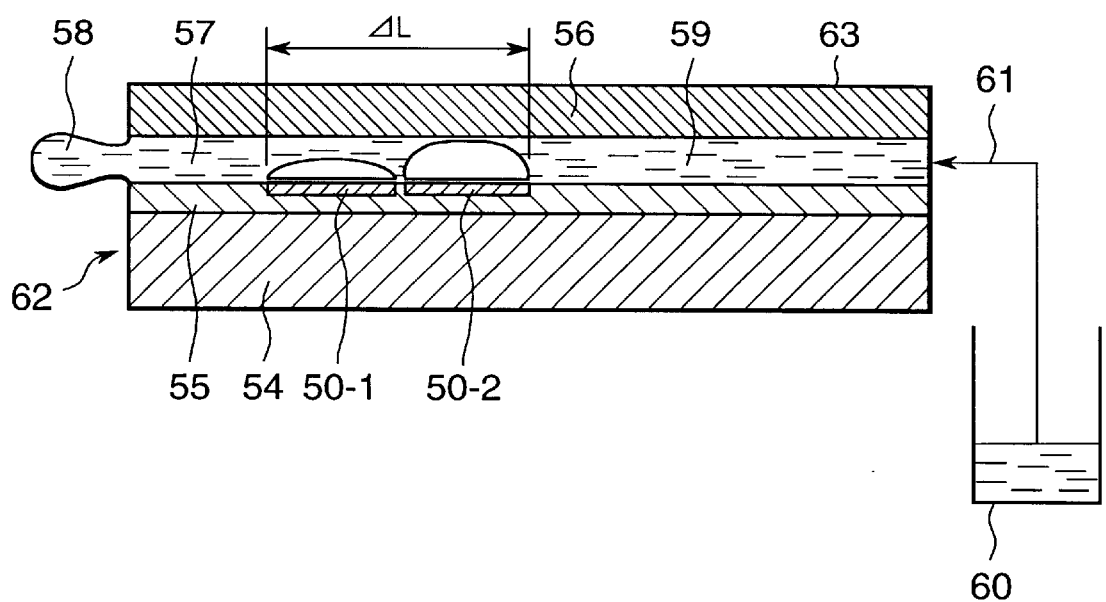
FIG. 17 is a cross sectional view of a liquid path in the printhead 21.

FIG. 17 is a cross sectional view of a liquid path in the printhead 21.

Referring to FIG. 17, a liquid path 59 filled with liquid is formed by combining a member 62 with a member 63 with a groove having a predetermined width by glue such that the groove is covered with the member 62. The member 62 consist of a base board 54 made of glass or the like, a heat sink layer 55 provided on the base board 54 and electrothermal transducers 50-1, 50-2 provided on the heat sink layer 55.

An orifice 57 is formed at the end of the liquid path 59. Surface portions (ΔL), in contact with ink in the liquid path 59, of the electrothermal transducers 50-1 and 50-2 and the adjacent portion serve as a thermal acting portion. Due to heat generated by the electrothermal transducers 50-1 and 50-2 in accordance with an input signal, liquid in this thermal acting portion is subject to a sudden state change. In other word, the liquid is evaporated so as to create a bubble. This bubble causes an ink droplet 58 to be discharge from the orifice.

Liquid is supplied from a liquid reservoir 60 to the liquid path 59 through a tube 61.

Figure 18A:
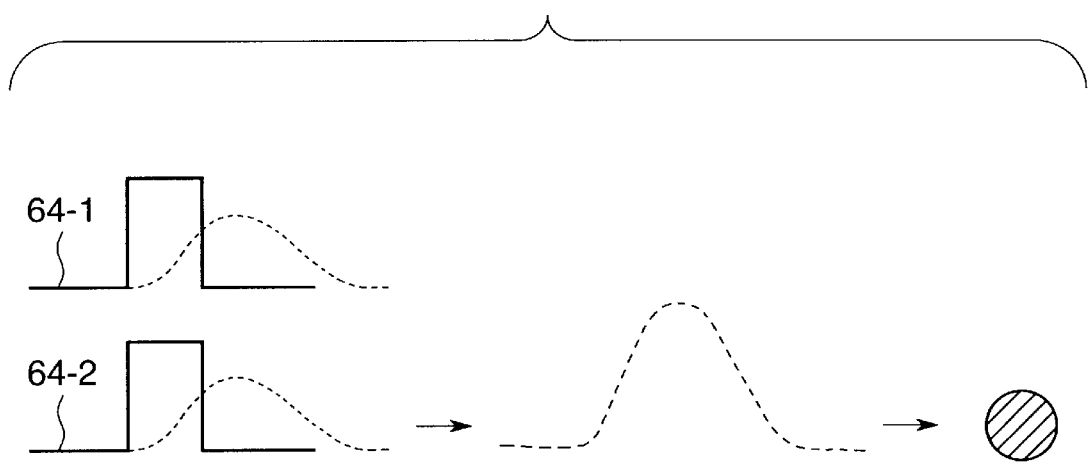
FIGS. 18A and 18B are diagrams showing the relationship among a signal inputted to the electrothermal transducers 50-1 and 50-2, a bubble volume and an amount (a size) of a discharged ink droplet.
Figure 18B:

FIGS. 18A and 18B conceptually show the relationship among a signal inputted to the electrothermal transducers 50-1 and 50-2, a bubble volume and an amount (a size) of a discharged ink droplet.

In FIGS. 18A and 18B, a solid line indicates a pulse signal showing an electric power supplied to the electrothermal transducers 50-1 and 50-2, and a broken line indicates the change of the bubble volume according to the heat generated by the electrothermal transducers 50-1 and 50-2.

FIG. 18A shows a case where pulses 64-1 and 64-2 are concurrently applied to the electrothermal transducers 50-1 and 50-2, respectively. In this case, the volume of a created bubble is large and the size (amount) of discharged ink droplet is large. FIG. 18B shows a case where only a pulse 64-1 is applied to the electrothermal transducer 50-1. In this case, the volume of a created bubble is small and the size (amount) of discharged ink droplet is small.

Figure 6:
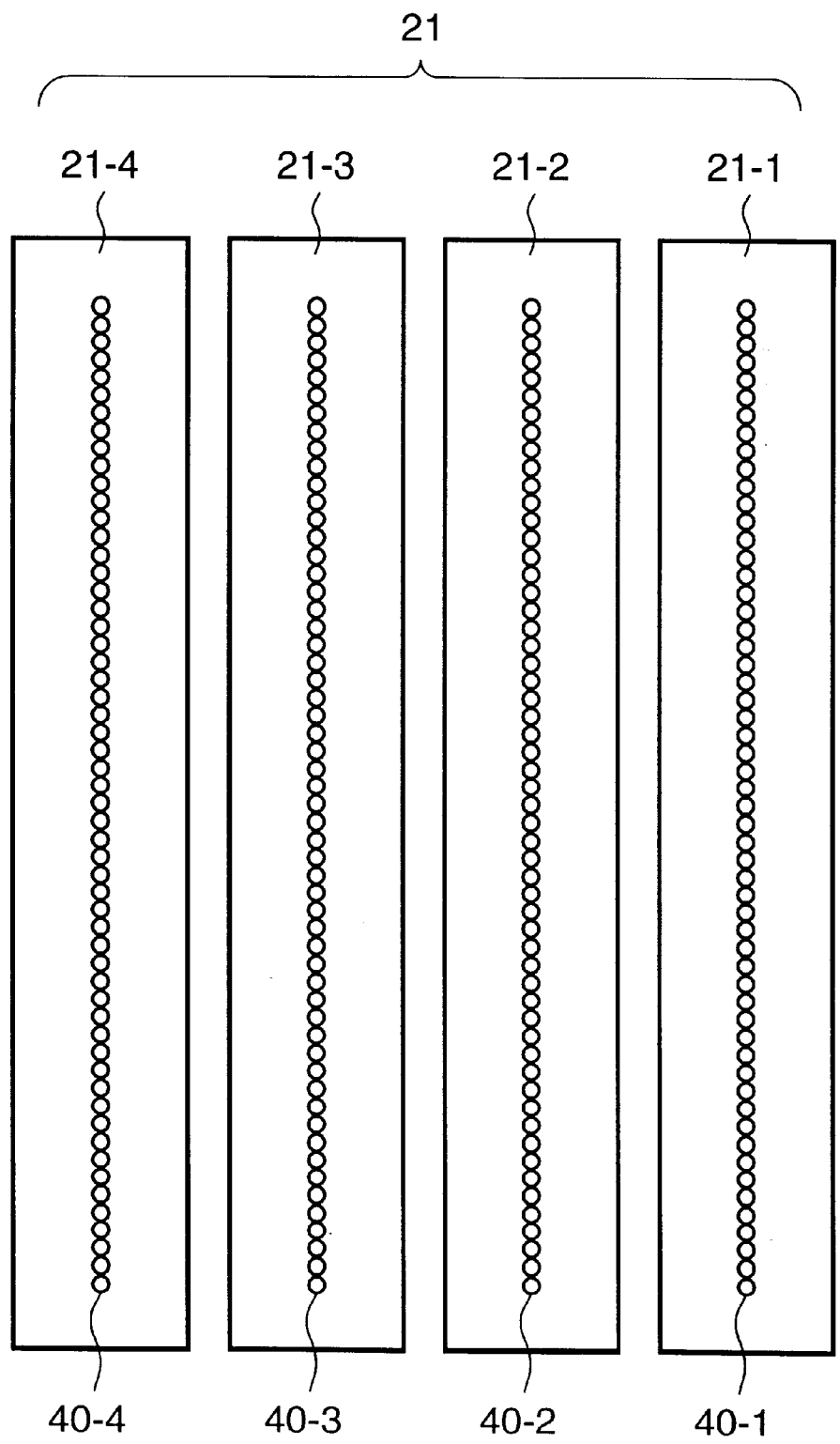
FIG. 6 is a view showing a printhead 21 when viewed from the orifice formation surface side.

FIG. 6 is a view showing the printhead 21 when viewed from the orifice formation surface side.

As shown in FIG. 6, reference numerals 40-1 to 40-4 denote orifice arrays for discharging the inks D1 to D4 in correspondence with the printheads 21-1 to 21-4. In this embodiment, each orifice array has 256 orifices with a 600-dot pitch per inch (600 dpi). The orifice arrays 40-1 to 40-4 can discharge and overlay four types of inks D1 to D4 in the conveyance direction (subscanning direction) of the printing medium while the carriage 20 is scanned once. As a result, a multi-level image can be formed without prolonging the print time.

[Ink Distribution Table]

FIG. 7 is a table showing the contents of the ink distribution table representing discharge/non-discharge of the inks D1, D2, D3, and D4 with respect to an 8-bit image signal level per pixel.

FIG. 7 shows the transmission densities of the inks D1, D2, D3, and D4, and the overlaid transmission density for the combination of these inks. The image signal level represents the density value, with a smaller value representing a lower density and a larger value representing a higher density.

For the sake of descriptive simplicity, the transmission density of a transparent film as a printing medium is set to 0D. The transmission densities of the inks D1, D2, D3, and D4 are expressed by the transmission densities obtained when printing is done over a predetermined area on the printing medium by discharging these inks using the inkjet printer in this embodiment. The density ratio of the inks D1, D2, D3, and D4 is 1:2:4:8, as described above. The table in FIG. 7 shows a case wherein an 8-bit image signal per pixel is expressed by 16 tonality levels from 0D to 2.4D.

[Ink Density Increase Graph]

Figure 8:
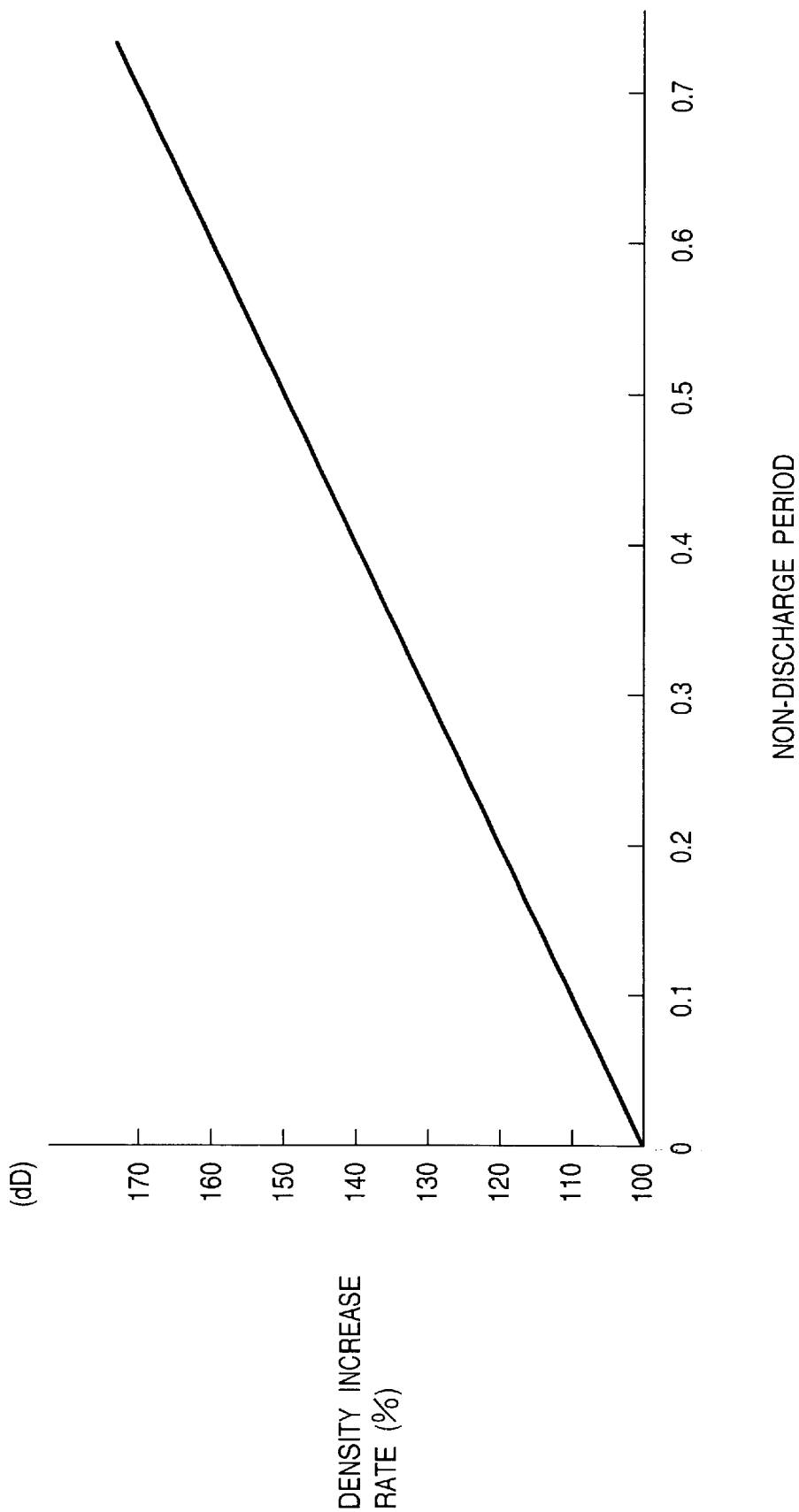
FIG. 8 is a graph showing the ink density increase rate with respect to the non-discharge lapse time of ink.

FIG. 8 is a graph showing the ink density increase rate with respect to the lapse of the non-discharge period of ink.

Referring to FIG. 8, the abscissa represents the non-discharge time of ink; and the ordinate, the increase rate of the transmission density of ink. A change shown in FIG. 8 is obtained by linearly approximating representative densities by the least squares method on the basis of experimental results. In this case, the "non-discharge time" is the time interval between a time when an ink droplet is discharged from one nozzle of the printhead 21 and a time when ink is discharged next.

As is apparent from FIG. 8, the increase rate of the density of ink in use is confirmed by an experiment to be proportional to the non-discharge time.

It is assumed in this embodiment that ink is discharged from the nozzle array of the printhead 21 at a frequency of 10 kHz.

When ink is continuously discharged, 10,000 ink droplets/sec are discharged from the nozzle array of the printhead 21 with a 600-dpi pitch. At this time, in this embodiment, the carriage 20 scans a short side (297 mm) of an A3 printing sheet in about 0.7 sec since the scanning speed of the carriage 20 is about 423.3 mm/sec.

As is apparent from FIG. 8, the ink density increases about 70% if no ink is discharged even once during scanning of the carriage 20 over a short side of an A3 printing sheet (about 0.7 sec).

An increase in ink density during scanning for printing operation results from the evaporation of the ink solvent at each nozzle tip. Once the ink whose density has increased at a nozzle tip is discharged as an ink droplet, fresh ink is refilled into the nozzle tip. Then, the density at the nozzle tip returns to the specified density before the density increase.

Figure 9:
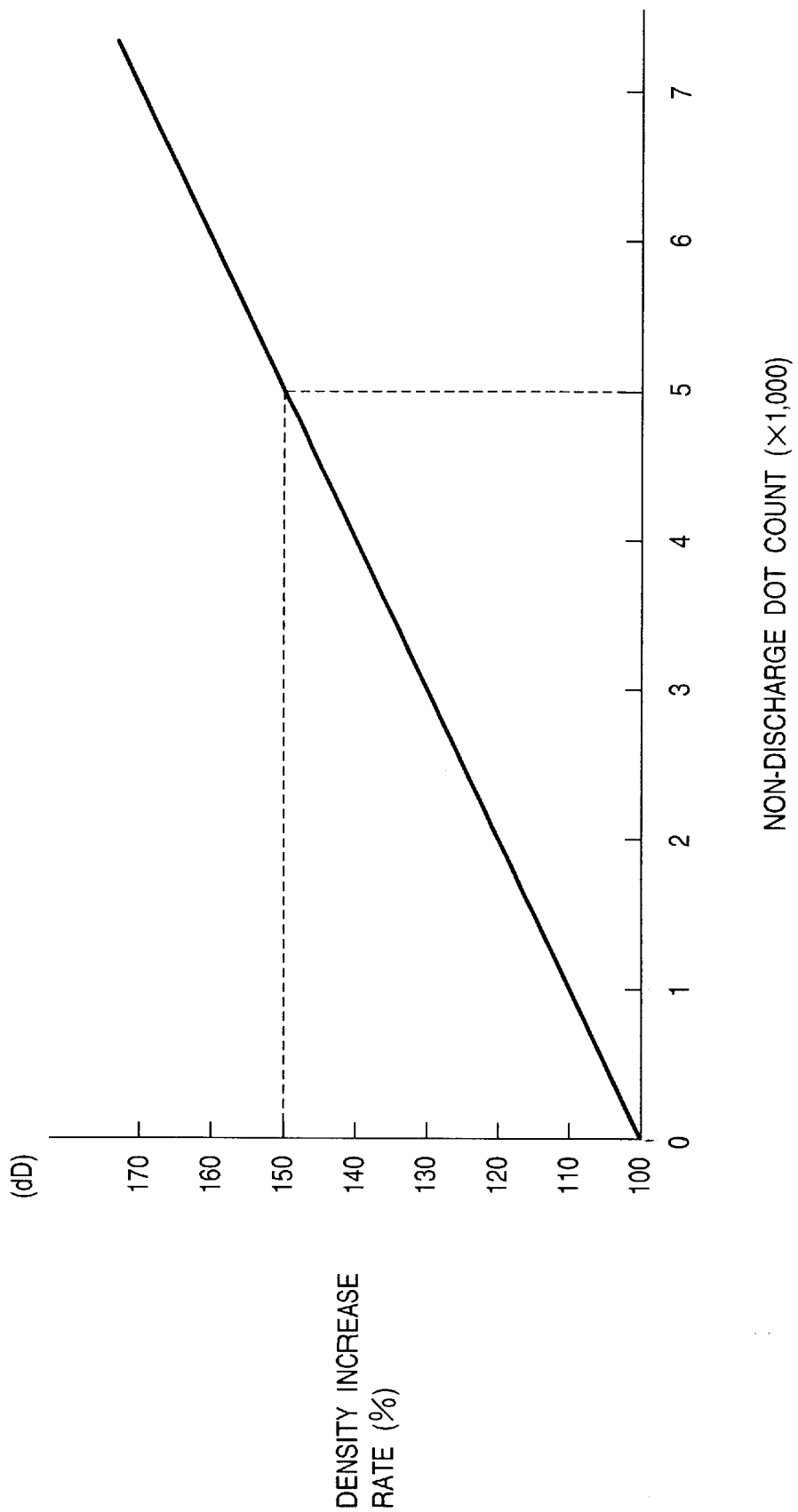
FIG. 9 is a graph showing the ink density increase rate (dD) expressed by the non-discharge dot count at a discharge frequency of 10 kHz as a function of the non-discharge time on the abscissa in FIG. 8.
Figure 11:
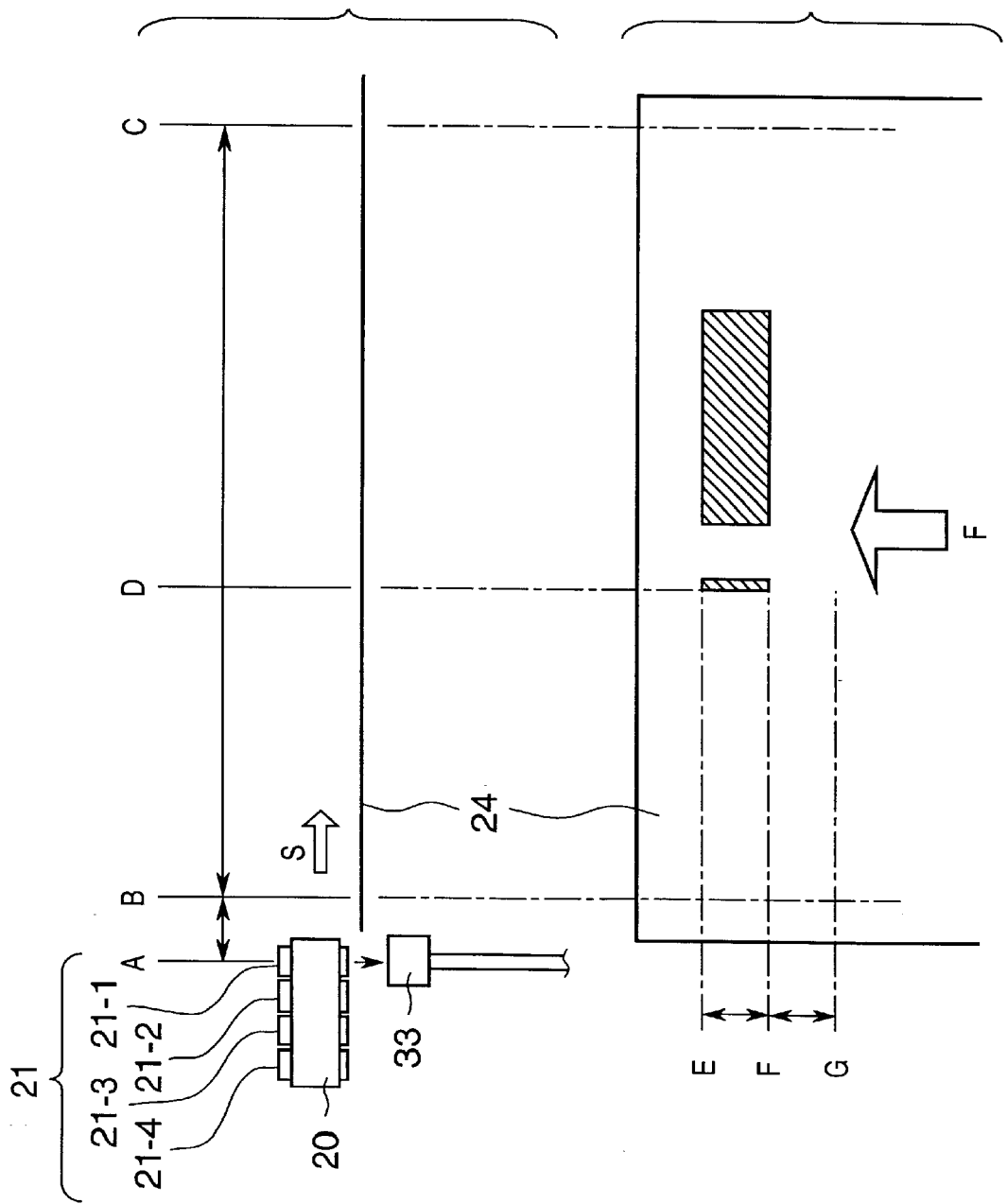
FIGS. 11A and 11B are schematic views showing a part of the printer engine 7 shown in FIG. 5 which concerns printing in the carriage moving direction (main scanning direction)

FIG. 9 is a graph showing the ink density increase rate (dD) expressed by the non-discharge dot count at a discharge frequency of 10 kHz with respect to the non-discharge time on the abscissa in FIG. 8.

In this embodiment, an increase in ink density is predicted based on the non-discharge history by referring to the density increase graph in processing of generating ternary signals each having one of three values: "large droplet discharge", "small droplet discharge", or "not discharge". The ink density is corrected by the increase amount, thereby printing an image free from any density increase.

In this embodiment, the ink density increase table is generated on the basis of changes shown in FIG. 9 so as to allow the CPU of the inkjet printer to easily refer to an ink density increase. The generated table is stored in the storage medium 4 such as a ROM.

According to FIG. 9, when the non-discharge period reaches 5,000 dots, the ink density increase rate is 150%. The ink density increase table will be described on the basis of this graph.

[Ink Density Increase Table]

FIG. 10 is a graph showing the contents of the ink density increase table (characteristic change table).

In this embodiment, these contents are stored in the area of the ink density increase table 4c in the storage medium 4.

The calculation results of the density increase rate (dD) shown in FIG. 9 are written in the density increase table shown in FIG. 10 in correspondence with the non-discharge count (N). By writing the calculation results in the table in advance, the calculation amount in real-time image processing can be reduced, resulting in an increase in processing speed. If the density increase rate (dD) for each non-discharge dot count (N) is expressed by 4-byte data, the address offset of the ink density increase table which can be accessed every byte is expressed by 4 bytes.

As shown in FIG. 10, the non-discharge count (N) corresponds to an address offset, and can be made to correspond to the address by multiplying the non-discharge count (N) by four. This value (4×N) is added to the base address in the ink density increase table. The contents at the address are read out to obtain a density increase rate. In addition, this ink density at the corresponding time can be predicted by multiplying this increase rate by the basic ink density to be obtained.

[Details of Image Processing]

The functional arrangement of the image processing unit 6 has been described with reference to FIGS. 4A and 4B.

Processing of generating a ternary signal will be explained in more detail with reference to FIGS. 11A to 16.

FIGS. 11A and 11B are schematic views showing a part of the printer engine 7 shown in FIG. 5 which concerns printing in the carriage moving direction (main scanning direction). FIG. 11A is a side view of this portion, and FIG. 11B is a view showing the printing medium 24 when viewed from above.

When a print start signal is sent to the printer engine 7, the carriage 20, on which the printhead 21 is mounted, starts to move from the home position (not shown) in the direction indicated by an arrow S. The carriage 20 reaches a constant speed when the printhead 21 passes over the ink accepter 33. The printheads 21-1, 21-2, 21-3, and 21-4 pass over the ink accepter 33 in the order named and performs preliminary discharge toward the ink accepter 33 at a position A.

After that, the printhead 21 can print an image in an area between B-C of the printing medium 24. In FIGS. 11A and 11B, printing starts from a position D.

The printhead 21 can print an image in an area having a width E-F on the printing medium 24 in one scanning operation of the carriage, and can print an image in an area having a width F-G in the next scanning operation.

As described above, ink is discharged from the nozzle array of the printhead 21 of this apparatus at a frequency of 10 kHz, and the print density in the main scanning direction is 600 dpi. The main scanning speed of the carriage 20 is therefore about 423.3 mm/sec.

Assume that the distance from the preliminary discharge position A to the print start position D is 211.7 mm. The printhead reaches the print start position D at 0.5 sec after the preliminary discharge at the main scanning speed, and starts printing in accordance with a generated discharge pattern.

If ink is discharged by this printing start, ink whose density has increased at the nozzle tip of the printhead is discharged as an ink droplet, and the ink density at the nozzle tip is restored to the normal value.

Assume that the density increase rate of each of the inks D1, D2, D3, and D4 exhibits the characteristics shown in FIGS. 8 and 9 in application of ink densities and overlaid transmission densities corresponding to the density values of an image signal set in the ink distribution table shown in FIG. 7, and the ink density at the nozzle tip is restored to the normal value immediately after preliminary discharge at the position A on the ink accepter 33 shown in FIG. 11A. Then, the density of the nozzle tip increases by about 50% at the print start position D because the carriage 20 requires 0.5 sec to move from the position A to position D.

Figure 12:
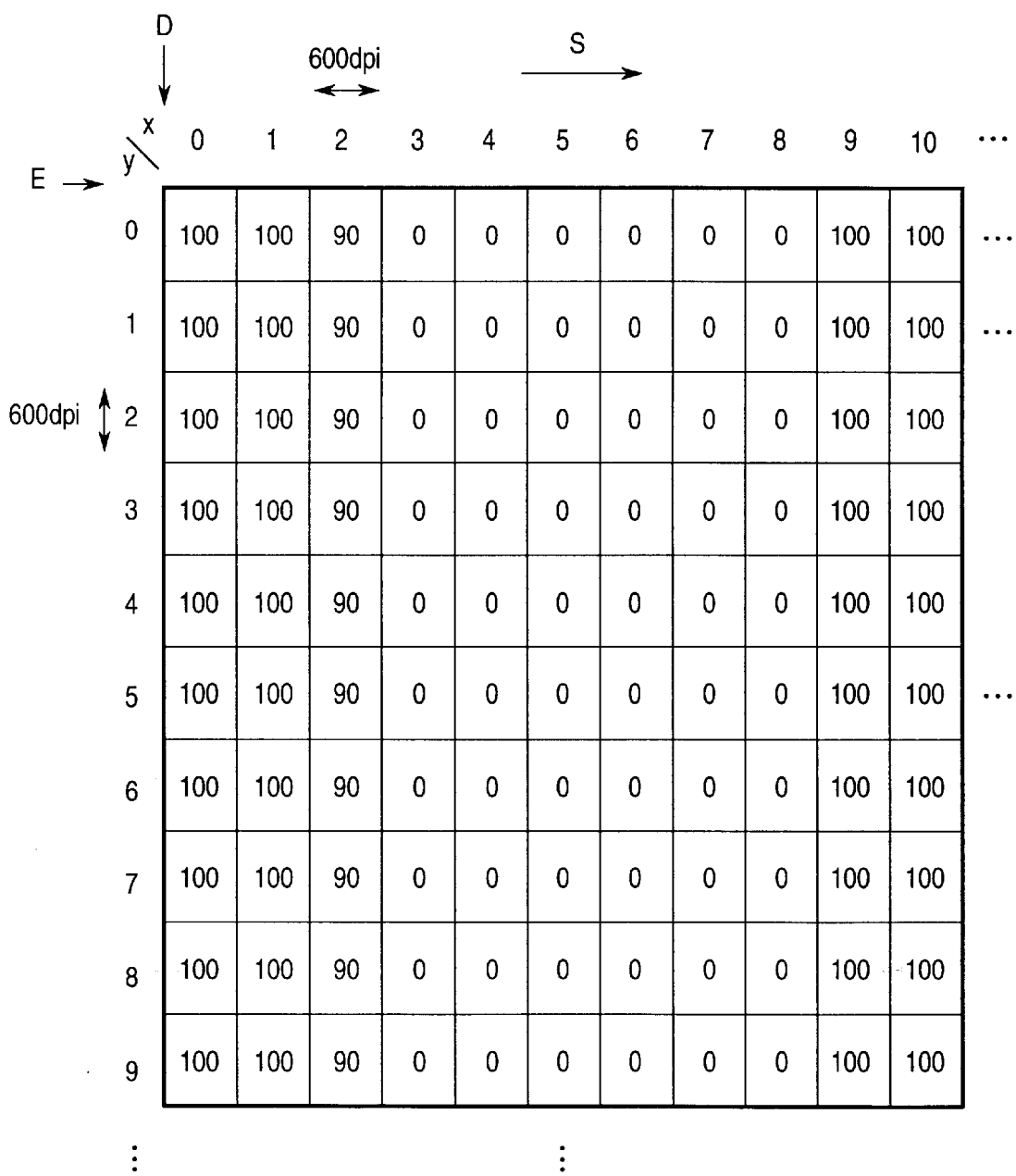
FIG. 12 is a table showing an example of the density signal level of image data stored in the page memory area in the image processing work area of a RAM 5 in order to print an image on a printing medium 24 shown in FIGS. 11A and 11B.

FIG. 12 is a table showing an example of the density signal level of image data stored in the page memory area in the image processing work area of the RAM 5 in order to print an image on the printing medium 24 shown in FIGS. 11A and 11B. Reference symbols shown in FIG. 12 correspond to those in FIGS. 11A and 11B, and one square in FIG. 12 corresponds to one pixel of an image printed at a resolution of 600 dpi.

As shown in FIG. 12, this image is formed by repeating similar patterns such as two pixels having a density value "100" in the main scanning direction (S direction), one pixel having a density value "90", six pixels having a density value "0", and again two pixels having a density value "100". In the subscanning direction, pixels having the same value continue.

Considering the overlaid transmission density shown in FIG. 7, the relationship between the transmission density value (OD) and density signal level in this embodiment can be given by $$OD = (2.4/255) \times \text{image density signal level}$$

As described above, since the image density signal and OD value are proportional, discharge data for each ink is actually generated by predicting an ink density from the digital value of the image density signal level instead of the OD value. That is, a 50% increase in OD value is equivalent to a 50% increase in image density signal level.

According to the change characteristics of the ink density shown in FIG. 9, every time the ink non-discharge operation count is incremented by one pixel, the ink density increases by 0.01%. If, however, a change in image data value shown in FIG. 12, i.e., the number of non-discharged pixels is about 10 pixels in the main scanning direction, the density increase rate is about 0.1% at most. For the sake of descriptive simplicity, therefore, an increase in ink density will be neglected.

As shown in FIG. 7, the transmission densities of the inks D1, D2, D3, and D4 used alone correspond to "17", "34", "68", and "136" at the image density signal level, respectively.

FIG. 13 is a table which is obtained by adding multi-valued error diffusion thresholds and values corresponding to the image density signal levels of transmission densities of inks to the table shown in FIG. 7.

As shown in FIG. 11A, since the printhead 21 moves in the main scanning direction (S direction), each pixel row in the main scanning direction corresponds to one nozzle of the printhead.

Ternary signal generation processing will be described in detail on the basis of the contents of the above-described tables, an increase in ink density, the layout of the pixel matrix of an image formed by image data.

However, as discussed above, there are two types of image processing units. One is a unit not employing an error diffusion method for multi-valued image representation. The other is a unit employing an error diffusion method for multi-valued image representation.

From here onward, a detailed image processing in a case where the former is used will be described first. And, a detailed image processing in a case where the latter is used will be described next.

Referring back to FIG. 12, the numbers starting from "0", which are assigned to the upper and left sides of the pixel matrix shown in FIG. 12, indicate the addresses of pixels. In this matrix, an arbitrary pixel is indicated by (x, y) with x and y respectively indicating the horizontal and vertical directions. For example, a pixel (0, 0) indicates the pixel at the upper left of the matrix.

First of all, processing is performed with the pixel (0, 0). The density signal level of the pixel (0, 0) is "100" in FIG. 12. In consideration of ink combinations from the threshold table shown in FIG. 13, a combination of "large droplet discharge" by the ink D2 and "large droplet discharge" by the ink D3, which is indicated by the combination number No. 6, is selected as a candidate. As described above, however, the ink densities of both the inks D2 and D3 have increased by 50%. It can be predicted from this that the transmission density of the ink D2 has increased from "34" to "51", and the transmission density of the ink D3 has increased from "68" to "102". With the combination of "large droplet discharge" by the ink D2 and "large droplet discharge" by the ink D3, therefore, the density becomes "153" which is higher than target density "102" by about 50%.

Consider a case where the density signal level of the ideal combination is "102", and the density signal level "100" of the pixel (0, 0) is to be expressed. Since the ink density of both the inks D2 and D3 have increased, it is inappropriate that ink is discharged in accordance with the contents of the threshold table. Thus, the ink D3 is set to "small droplet discharge" under the control of this embodiment. As a result, the ink discharge amount of the ink D3 is halved from 40 pl to 20 pl to decrease the transmission density. The predicted density of "large droplet discharge" by the ink D2 becomes "51", the predicted density of "small droplet discharge" by the ink D3 becomes "51", and the predicted density of this discharge combination becomes "102".

The ink combination determined in this manner is stored as a ternary signal pattern indicating "large droplet discharge", "small droplet discharge", or "not discharge" of each ink at an address in a corresponding one of memories Md1, Md2, Md3, and Md4 defined in the RAM 5 in correspondence with the pixel (0, 0).

The processing for the target pixel (0, 0) is terminated with the above operation, and the ternary signals d1, d2, d3, and d4 for the pixel (0, 0) are determined.

The pixel (1, 0) is set as the next target pixel.

The density signal level of this pixel (1, 0) is "100" as shown in FIG. 12. As in the case with the pixel (0, 0), the combination No. 6 of "large droplet discharge" by the ink D2 and "large droplet discharge" by the ink D3 is selected as a candidate by referring to the threshold table shown in FIG. 13.

Since "large droplet discharge" by the ink D2 and the "large droplet discharge" by the ink D3 occur at the pixel (0, 0), the densities of the inks D2 and D3 are almost restored to the normal values. In contrast to this, the densities of the remaining inks (D1 and D4) have been increased by 50% since no ink is discharged after preliminary discharge.

However, the inks selected from the threshold table shown in FIG. 13 are the inks D2 and D3, and their densities have been restored to the normal values. Thus, the transmission density is "34" for "large droplet discharge" by the ink D2 and "68" for "large droplet discharge" by the ink D3. Consequently, the transmission density becomes "102" from the combination of "large droplet discharge" by the ink D2 and "large droplet discharge" by the ink D3. This combination is suitable for representing density signal level "100" of the pixel (1, 0), so that "large droplet discharge" by the inks D2 and D3 is determined.

The ink combination determined in this manner is stored as a ternary signal pattern indicating "large droplet discharge", "small droplet discharge", or "not discharge" of each ink at an address of each of the memories Md1, Md2, Md3, and Md4 defined in the RAM 5 in correspondence with the pixel (1, 0).

Similarly, the pixel (2, 0) is set as the next target pixel.

The density signal level of this pixel (2, 0) is "90" as shown in FIG. 12. Based on this value, the combination No. 5 of "large droplet discharge" by the ink D1 and "large droplet discharge" by the ink D3 is selected as a candidate by referring to the threshold table shown in FIG. 13. Since the inks D2 and D3 have been discharged for printing of the pixel (1, 0), the densities of the inks D2 and D3 are restored to the normal values. In contrast to this, the densities of the remaining inks (inks D1 and D4) have been increased by 50% since they are not discharged after preliminary discharge.

Considering a density increase shown in FIGS. 8 and 9, the transmission density is "25.5" for "large droplet discharge" by the ink D1 and "68" for "large droplet discharge" by the ink D3. The transmission density of this combination is predicted to be "93.5". This predicted value reaches a predetermined threshold, so ink discharge according to the contents of the threshold table is inappropriate. Hence, discharge by the ink D1 is set to "small droplet discharge" under the control of this embodiment. As a result, the ink discharge amount of the ink D1 is halved from 40 pl to 20 pl to decrease the transmission density to "12.25". The predicted density as the combination of the predicted density of "small droplet discharge" by the ink D1 and the predicted density of "large droplet discharge" by the ink D3 becomes "80.25".

The ink combination determined in this manner is stored as a ternary signal pattern indicating "large droplet discharge", "small droplet discharge", or "not discharge" of each ink at an address in each of the memories Md1, Md2, Md3, and Md4 defined in the RAM 5 in correspondence with the pixel (2, 0).

In this manner, the above processing is repeated for the sequentially selected target pixels in the main scanning direction (S) on the basis of the density signal level of image data. As a result, the ternary signals d1, d2, d3, and d4 are generated for each pixel using the four inks having different densities. These ternary signals d1, d2, d3, and d4 are stored at the addresses in the memories Md1, Md2, Md3, and Md4 in correspondence with each pixel.

When the processing for one line is complete in this manner, the first pixel, i.e., pixel (0, 1) on the next line is set as the next target pixel, and similar processing is executed in the main scanning direction. At this time, as in the case with the pixel (0, 0) as the target pixel, processing is started on the basis of a prediction that the density of each ink has increased by 50% at the target pixel (0, 1).

Similar processing is repeated for each line to generate a binary pattern showing discharge/non-discharge of each ink.

FIG. 14 is a table showing ternary signal values generated by the above processing that are stored in the memories Md1, Md2, Md3, and Md4.

In FIG. 14, ternary signals indicating "large droplet discharge", "small droplet discharge", or "not discharge" of each of the inks D1, D2, D3, and D4 are respectively stored in the memories Md1, Md2, Md3, and Md4. "x/y" at the upper left end of each memory matrix means "x/y" shown in FIG. 12, and each memory matrix corresponds to that in FIG. 12.

Figure 15:
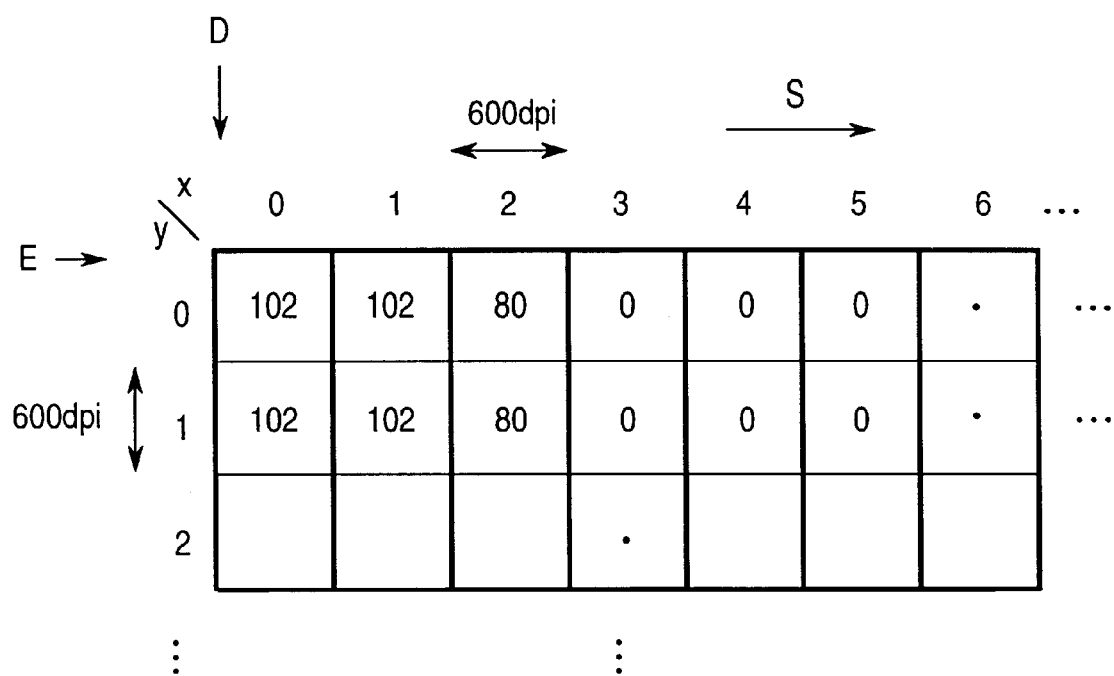
FIG. 15 is a table showing the state of the density distribution when an input image density signal is actually used for printing.

FIG. 15 is a table showing the state of the density distribution when an input image density signal shown in FIG. 12 is actually used for printing by changing the combination of inks on the basis of the basic ink distribution table shown in FIG. 7 or 13. As is apparent from FIG. 15, an abrupt density increase at an image print start point, e.g., at the left end in FIG. 15 is suppressed.

Next, a detailed image processing in a case where an image processing unit employs an error diffusion method will be described.

Figure 16:
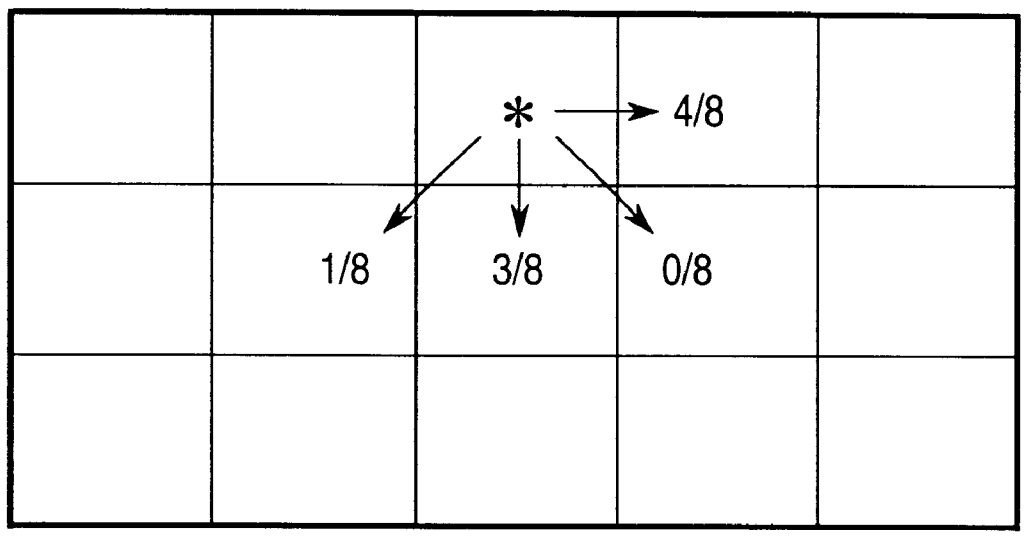
FIG. 16 is a view showing an example of how weighting is performed to distribute an error in a target pixel to neighboring pixels in multi-valued error diffusion processing executed in this embodiment.

FIG. 16 shows an example of how weighting is performed to distribute an error in a target pixel to neighboring pixels in multi-valued error diffusion processing executed in this embodiment. Referring to FIG. 16, reference symbol "*" denotes a target pixel.

In error diffusion processing in this embodiment, the difference error between the representable density level by a combination of four inks and the image density signal level is distributed to neighboring pixels in accordance with the error distribution coefficients shown in FIG. 16.

First of all, processing is performed with the pixel (0, 0). The density signal level of the pixel (0, 0) is "100" in FIG. 12. In consideration of ink combinations from the threshold table shown in FIG. 13, a combination of "large droplet discharge" by the ink D2 and "large droplet discharge" by the ink D3, which is indicated by the combination number No. 6, is selected as a candidate. As described above, however, the ink densities of both the inks D2 and D3 have increased by 50%. It can be predicted from this that the transmission density of the ink D2 has increased from "34" to "51", and the transmission density of the ink D3 has increased from "68" to "102". With the combination of "large droplet discharge" by the ink D2 and "large droplet discharge" by the ink D3, therefore, the density becomes "153" which is higher than target density "102" by about 50%.

Consider a case where the density signal level of the ideal combination is "102", and the density signal level "100" of the pixel (0, 0) is to be expressed. Since the ink density of both the inks D2 and D3 have increased, it is inappropriate that ink is discharged in accordance with the contents of the threshold table. Thus, the ink D3 is set to "small droplet discharge" under the control of this embodiment. As a result, the ink discharge amount of the ink D3 is halved from 40 pl to 20 pl to decrease the transmission density. The predicted density of "large droplet discharge" by the ink D2 becomes "51", the predicted density of "small droplet discharge" by the ink D3 becomes "51", and the predicted density of this discharge combination becomes "102".

The ink combination determined in this manner is stored as a ternary signal pattern indicating "large droplet discharge", "small droplet discharge", or "not discharge" of each ink at an address in a corresponding one of memories Md1, Md2, Md3, and Md4 defined in the RAM 5 in correspondence with the pixel (0, 0).

In this case, the difference error is difference "−2" obtained by subtracting predicted representable density "102" from image density signal level "100" of the pixel (0, 0). This difference is distributed to the neighbouring pixels of the target pixel in accordance with the error distribution coefficients in FIG. 14 such that "−8/8" is distributed to the pixel (1, 0), and "−6/8" is distributed to the pixel (0, 1). When the distributed errors are added to the respective neighboring pixels in this manner, the density signal level of the pixel (1, 0) is changed to "99", and the density signal level of the pixel (0, 1) is changed to "99.25".

The processing for the target pixel (0, 0) is terminated with the above operation, and the ternary signals d1, d2, d3, and d4 for the pixel (0, 0) are determined.

The pixel (1, 0) is set as the next target pixel.

The density signal level of this pixel (1, 0) has become "99" by error diffusion from the pixel (0, 0) described above. As in the case with the pixel (0, 0), the combination No. 6 of "large droplet discharge" by the ink D2 and "large droplet discharge" by the ink D3 is selected as a candidate by referring to the threshold table shown in FIG. 13.

Since "large droplet discharge" by the ink D2 and the "small droplet discharge" by the ink D3 occur at the pixel (0, 0), the densities of the inks D2 and D3 are almost restored to the normal values. In contrast to this, the densities of the remaining inks (D1 and D4) have been increased by 50% since no ink is discharged after preliminary discharge.

However, the inks selected from the threshold table shown in FIG. 13 are the inks D2 and D3, and their densities have been restored to the normal values. Thus, the transmission density is "34" for "large droplet discharge" by the ink D2 and "68" for "large droplet discharge" by the ink D3. Consequently, the transmission density becomes "102" from the combination of "large droplet discharge" by the ink D2 and "large droplet discharge" by the ink D3. This combination is suitable for representing density signal level "99" of the pixel (1, 0), SO that "large droplet discharge" by the inks D2 and D3 is determined.

The ink combination determined in this manner is stored as a ternary signal pattern indicating "large droplet discharge", "small droplet discharge", or "not discharge" of each ink at an address of each of the memories Md1, Md2, Md3, and Md4 defined in the RAM 5 in correspondence with the pixel (1, 0).

At this time, the difference error is difference "−3" obtained by subtracting predicted representable density value "102" from image density signal level "99" of the pixel (1, 0). This difference is distributed to the neighboring pixels in accordance with the error distribution coefficients in FIG. 14 such that "−12/8" is distributed to the pixel (2, 0), "−9/8" is distributed to the pixel (1, 1), and "−3/8" is distributed to the pixel (0, 1). These distributed errors are respectively added to the pixels (2, 0), (1, 1), and (0, 1) around the target pixel.

Similarly, the pixel (2, 0) is set as the next target pixel.

The density signal level of this pixel (2, 0) has become "88.5" by error diffusion from the pixel (1, 0). Based on this value, the combination No. 5 of "large droplet discharge" by the ink D1 and "large droplet discharge" by the ink D3 is selected as a candidate by referring to the threshold table shown in FIG. 13. Since the inks D2 and D3 have been discharged for printing of the pixel (1, 0), the densities of the inks D2 and D3 are restored to the normal values. In contrast to this, the densities of the remaining inks (inks D1 and D4) have been increased by 50% since they are not discharged after preliminary discharge.

Considering a density increase shown in FIGS. 8 and 9, the transmission density is "25.5" for "large droplet discharge" by the ink D1 and "68" for "large droplet discharge" by the ink D3. The transmission density of this combination is predicted to be "93.5". This predicted value reaches the threshold of error diffusion processing, so ink discharge according to the contents of the threshold table is inappropriate. Hence, discharge by the ink D1 is set to "small droplet discharge" under the control of this embodiment. As a result, the ink discharge amount of the ink D1 is halved from 40 pl to 20 pl to decrease the transmission density to "12.25". The predicted density as the combination of the predicted density of "small droplet discharge" by the ink D1 and the predicted density of "large droplet discharge" by the ink D3 becomes "80.25".

The ink combination determined in this manner is stored as a ternary signal pattern indicating "large droplet discharge", "small droplet discharge", or "not discharge" of each ink at an address in each of the memories Md1, Md2, Md3, and Md4 defined in the RAM 5 in correspondence with the pixel (2, 0).

At this time, the difference error is difference "−8.25" obtained by subtracting image density signal level "88.5" of the pixel (2, 0) from predicted density value "80.25". This difference is distributed to the neighboring pixels in accordance with the error distribution coefficients shown in FIG. 14 such that "−33/8" is distributed to the pixel (3, 0), "−24.75/8" is distributed to the pixel (2, 1), and "−8.25/8" is distributed to the pixel (1, 1). These errors are then added to these neighboring pixels (3, 0), (2, 1), and (1, 1).

In this manner, the above processing is repeated for the sequentially selected target pixels in the main scanning direction (S) on the basis of the density signal level of image data. As a result, the ternary signals d1, d2, d3, and d4 are generated for each pixel using the four inks having different densities. These ternary signals d1, d2, d3, and d4 are stored at the addresses in the memories Md1, Md2, Md3, and Md4 in correspondence with each pixel.

When the processing for one line is complete in this manner, the first pixel, i.e., pixel (0, 1) on the next line is set as the next target pixel, and similar processing is executed in the main scanning direction. At this time, as in the case with the pixel (0, 0) as the target pixel, processing is started on the basis of a prediction that the density of each ink has increased by 50% at the target pixel (0, 1).

Similar processing is repeated for each line to generate a binary pattern showing discharge/non-discharge of each ink.

According to the above-mentioned embodiment, an ink density increase is predicted by obtaining a lapse time from previous ink discharge using a preliminary discharge position, preliminary discharge time, and the density distribution on a formed image based on input image data. Discharging ink having a proper density is controlled on the basis of the predicted value. Thus, even if the ink density in the nozzle changes from the original density owing to the absence of ink discharge for a while, the density change is compensated by using another ink having a different density or changing the ink discharge amount. As a result, a high-quality image free from any density unevenness can be printed.

In the above embodiment, one density increase table (characteristics change table) is referred to for the density of each ink. Alternatively, a plurality of ink increase tables (characteristics change tables) may be prepared for different density increase rates due to different ink densities, or different density increase tables (characteristics change tables) may be prepared for respective inks.

When the ink density increase rate and non-discharge period are not proportional to each other, for example, when the density increase is saturated upon the lapse of time, their relationship is reflected on the density increase table (characteristics change table) shown in FIG. 10.

In the above description, an ink density change over time is a density increase. In the present invention, however, the density change is not limited to the density increase as far as the density change indicates ink density change characteristics.

Further, if a rewritable storage medium such as the RAM 5 is selected as the storage location of the density increase table (characteristics change table) described in the above embodiment, flexibility can be further enhanced.

In the above embodiment, the combination of inks is changed on the basis of the ink distribution table formed based on inks before an ink density increase, i.e., inks which have not changed in density yet. Instead, if the ink distribution table of the standard ink density adopts an algorithm of always discharging an ink having the highest standard density, an increase in OD value by an ink density increase can be suppressed to reduce image distortion. For example, in the distribution table shown in FIG. 7, the ink D4 is not used unless the density signal level is equal to or more than "136", but is used at density signal level "68" or more in consideration of "small droplet discharge" of the ink. Therefore, for an ink density increase of 50%, the OD value of the ink D4 most greatly changes. For this reason, the ink D4 is desirably used as often as possible.

In the above embodiment, a signal to the printhead having, in the nozzle, at least two heating elements capable of independently receiving signals is inputted, and an ink discharge amount is modulated in accordance with a tonality value. However, the present invention is not limited to this and can be applied to any printhead not having two heating elements in each nozzle so long as the printhead can modulate the ink discharge amount by changing the pulse waveform of a printhead driving signal.

Although an inkjet printer using an inkjet printhead has been exemplified, the present invention can also be applied to a printer apparatus of another printing method. For example, in a printer using a heating head, such as a sublimation printer, continuous printing operation raises the temperature of the printhead to increase the density of a printed image. Thus, if the density increase table (characteristics change table) described in the above embodiment is replaced with the relationship between the print duty and density increase, a print density increase can be predicted to perform corresponding correction.

Furthermore, if parameters such as variations in print density due to changes in quality of heat-sensitive sheets, ink ribbons, cartridge films for a sublimation type printer, and the like are input to density increase table (characteristics change table), these variations can also be corrected.

However, the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open Publication No. 59-123670 which discloses the arrangement using a slot common to a plurality of electrothermal transducers as a discharge portion of the electrothermal transducers, or Japanese Patent Laid-Open Publication No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself but also an exchangeable chip type printhead, as described in the above embodiment, which can be electrically connected to the apparatus main unit and can receive an ink from the apparatus main unit being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open Publication No. 54-56847 or 60-71260. In the present invention, the above-mentioned film boiling system is most effective for the above-mentioned inks.

In addition, the ink-jet printer of the present invention may be used in the form of a copying machine. combined with a reader, and the like, or a facsimile apparatus having a transmission/reception function in addition to an image output terminal of an information processing equipment such as a computer.

The present invention can be applied to a system constituted by a plurality of devices (e.g., host computer, interface device, reader, printer etc.) or to an apparatus comprising a single device (e.g., copy machine, facsimile etc.).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A printing method of performing printing on a printing medium by discharging ink from an inkjet printhead using a plurality of inks having different densities, comprising:
   an input step, of inputting multi-valued image data;
   a calculation step, of calculating a lapse time from previous ink discharges by the printhead;
   a prediction step, of predicting a print density change according to a time variation of ink based on the lapse time calculated in said calculation step;
   a selection step, of selecting a type of ink and ink discharge amount suitable for representing a density value indicated by the input multi-valued image data based on the print density change predicted in said prediction step; and
   a driving step, of driving the printhead to cause ink discharge from the printhead based on the type of ink and ink discharge amount selected in said selection step.

2. The method according to claim 1, wherein said selection step includes:
   a step of selecting a type of ink to be discharged based on the multi-valued image data; and
   a step of changing a discharge amount of the selected type of ink in accordance with the predicted print density change.

3. The method according to claim 1, wherein, in said driving step, droplets of a plurality of types of inks having different densities are discharged on the substantially same pixel position of the printing medium.

4. The method according to claim 1, wherein said prediction step includes using a characteristic change table storing a relationship between the lapse time and the density change of ink.

5. The method according to claim 4, wherein the characteristic change table is provided for each of a plurality of inks having different densities.

6. The method according to claim 4, wherein the characteristic change table is rewritable.

7. The method according to claim 1, wherein a plurality of printheads are used in correspondence with the plurality of inks having different densities.

8. The method according to claim 1, wherein said selection step selects a type of ink and an ink discharge amount for each pixel subjected to printing.

9. The method according to claim 1, wherein the plurality of inks having different densities are inks of the same color.

10. The method according to claim 1, further comprising a pseudo half-tone step of performing pseudo half-tone processing in order to represent a density value indicated by the input multi-valued image data.

11. The method according to claim 10, wherein the pseudo half-tone processing uses an error diffusion method.

12. A printing apparatus for performing printing on a printing medium by discharging ink from an inkjet printhead using a plurality of inks having different densities, comprising:

input means for inputting multi-valued image data;

calculation means for calculating a lapse time from previous ink discharges by the printhead;

prediction means for predicting a print density change according to a time variation of ink based on the lapse time calculated by said calculation means;

selection means for selecting a type of ink and ink discharge amount suitable for representing a density value indicated by the multi-valued image data inputted by said input means, based on the print density change predicted by said prediction means; and driving means for driving the printhead to cause ink discharge from the printhead based on the type of ink and ink discharge amount selected by said selection means.

13. The apparatus according to claim 12, wherein said selection means includes:

means for selecting a type of ink to be discharged based on the multi-valued image data; and means for changing a discharge amount of the selected type of ink in accordance with the print density change predicted by said prediction means.

14. The apparatus according to claim 12, wherein said driving means discharges droplets of a plurality of types of inks having different densities to the substantially same pixel position of the printing medium.

15. The apparatus according to claim 12, wherein said prediction means performs prediction by using a characteristic change table, which stores a relationship between the lapse time and the density change of ink.

16. The apparatus according to claim 12, wherein a plurality of printheads are used in correspondence with the plurality of inks having different densities.

17. The apparatus according to claim 12, wherein the printhead comprises a plurality of nozzles for discharging ink.

18. The apparatus according to claim 17, wherein each of the plurality of nozzles of the printhead comprises an electrothermal transducer for generating heat energy in order to discharge ink by the heat energy.

19. The apparatus according to claim 17, wherein each of the plurality of nozzles comprises a plurality of electrothermal transducers for changing an ink discharge amount from each of the plurality of nozzles.

20. The apparatus according to claim 12, wherein said selection means selects a type of ink and an ink discharge amount for each pixel subjected to printing.

21. The apparatus according to claim 20, wherein said selection means performs selection by referring to a table representing a relationship between a density value represented by the multi-valued image data, and a representable density value by a combination of inks having different densities.

22. The apparatus according to claim 12, wherein the plurality of inks having different densities are inks of the same color.

23. The apparatus according to claim 12, further comprising pseudo half-tone means for performing pseudo half-tone processing using an error diffusion method in order to represent a density value indicated by the multi-valued image data inputted by said input means.

24. A computer-readable memory which stores a program for executing printing processing of printing on a printing medium by discharging ink from an inkjet printhead using a plurality of inks having different densities, the program comprising:

codes for executing input processing of inputting multi-valued image data;

codes for executing calculation processing of calculating a lapse time from previous ink discharges by the printhead;

codes for executing prediction processing of predicting a print density change according to a time variation of ink based on the lapse time calculated in the calculation processing;

codes for executing selection processing of selecting a type of ink and ink discharge amount suitable for representing a density value indicated by the input multi-valued image data based on the print density change predicted in prediction processing; and codes for executing driving processing of driving the printhead to cause ink discharge from the printhead based on the type of ink and ink discharge amount selected in the selection processing.

* * * * *

UNITED STATES PATENT AND TRADEMARK OFFICE
CERTIFICATE OF CORRECTION

PATENT NO. : 6,443,548 B1  
DATED : September 3, 2002  
INVENTOR(S) : Hidehito Takayama et al.

It is certified that error appears in the above-identified patent and that said Letters Patent is hereby corrected as shown below:

<u>Title page,</u>  
Item [56], FOREIGN PATENT DOCUMENTS,  
"59-138461   8/1994" should read -- 59-138461   8/1984 --.

<u>Column 2,</u>  
Line 14, "SID' 75" should read -- SID '75 --.

<u>Column 3,</u>  
Lines 23 and 67, "discharge" should read -- discharged --.

<u>Column 5,</u>  
Line 56, "cross sectional" should read -- cross-sectional --.

<u>Column 6,</u>  
Line 24, "a" should read -- an --.

<u>Column 10,</u>  
Line 48, "cross sectional" should read -- cross-sectional --;  
Line 65, "word," should read -- words, --;  
Line 66, "discharge" should read -- discharged --.

<u>Column 15,</u>  
Line 36, "D3" should read -- D3. --.

<u>Column 20,</u>  
Line 15, "has" should read -- have --.

Signed and Sealed this

Eighth Day of April, 2003

JAMES E. ROGAN  
*Director of the United States Patent and Trademark Office*